(12) United States Patent
Kwak et al.

(10) Patent No.: US 12,340,608 B2
(45) Date of Patent: Jun. 24, 2025

(54) ELECTRONIC DEVICE FOR PROCESSING HANDWRITING INPUT, AND OPERATION METHOD THEREFOR

(71) Applicant: Samsung Electronics Co., Ltd., Suwon-si (KR)

(72) Inventors: Taewon Kwak, Suwon-si (KR); Donghyuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/731,885

(22) Filed: Jun. 3, 2024

(65) Prior Publication Data

US 2024/0320994 A1    Sep. 26, 2024

Related U.S. Application Data

(63) Continuation of application No. 18/324,628, filed as application No. PCT/KR2021/017864 on Nov. 30, 2021, now Pat. No. 12,002,275.

(30) Foreign Application Priority Data

Dec. 17, 2020    (KR) ........................ 10-2020-0177108

(51) Int. Cl.
*G06F 3/0483*    (2013.01)
*G06F 3/04845*    (2022.01)
(Continued)

(52) U.S. Cl.
CPC ............ *G06V 30/22* (2022.01); *G06F 3/0483* (2013.01); *G06F 3/04845* (2013.01);
(Continued)

(58) Field of Classification Search
CPC .. G06V 30/22; G06V 30/30; G06V 30/19013; G06F 40/103; G06F 3/0483; G06F 3/04845; G06F 3/04883
See application file for complete search history.

(56) References Cited

U.S. PATENT DOCUMENTS

| 2013/0300675 A1 | 11/2013 | Tsutsui et al. |
| 2014/0232727 A1 | 8/2014 | Cheong et al. |

(Continued)

FOREIGN PATENT DOCUMENTS

| JP | 08-305793 A | 11/1996 |
| JP | 2013-238917 A | 11/2013 |

(Continued)

OTHER PUBLICATIONS

International Search Report dated Mar. 4, 2022, issued in an International Application No. PCT/KR2021/017864.

(Continued)

*Primary Examiner* — Sejoon Ahn
(74) *Attorney, Agent, or Firm* — Jefferson IP Law, LLP

(57) ABSTRACT

An electronic device is provided. The electronic device includes a display and at least one processor, wherein the at least one processor can be configured to identify a first tilt between a first handwriting input displayed on the display and a first preceding handwriting input that precedes the first handwriting input, the first handwriting input corresponding to a first block, identify a second tilt between a second handwriting input displayed on the display and a second preceding handwriting input that precedes the second handwriting input, the second handwriting input being continuous to the first handwriting input, use the first tilt and the second tilt to determine whether the second handwriting input corresponds to the first block or corresponds to a second block differing from the first block, and perform, based on the second handwriting input corresponding to the (Continued)

<510>

<520> second block, at least one operation for processing a plurality of handwriting inputs indicating the second block.

20 Claims, 18 Drawing Sheets

(51) Int. Cl.
    *G06F 3/04883*     (2022.01)
    *G06F 40/103*     (2020.01)
    *G06V 30/19*     (2022.01)
    *G06V 30/22*     (2022.01)
    *G06V 30/30*     (2022.01)

(52) U.S. Cl.
    CPC ........ *G06F 3/04883* (2013.01); *G06F 40/103* (2020.01); *G06V 30/19013* (2022.01); *G06V 30/30* (2022.01)

(56) References Cited

U.S. PATENT DOCUMENTS

| | | | |
|---|---|---|---|
| 2014/0245137 A1 | 8/2014 | Kim et al. | |
| 2014/0253595 A1 | 9/2014 | Lee | |
| 2015/0302242 A1 | 10/2015 | Lee et al. | |
| 2016/0147723 A1 | 5/2016 | Lee et al. | |
| 2016/0154474 A1 | 6/2016 | Parl et al. | |
| 2016/0299606 A1* | 10/2016 | Go | G06F 3/04883 |
| 2016/0364025 A1 | 12/2016 | Bernstein et al. | |
| 2017/0322638 A1* | 11/2017 | Hosono | G06F 3/041 |
| 2017/0322702 A1* | 11/2017 | Wang | G06F 3/04845 |
| 2017/0323436 A1* | 11/2017 | Foland | G06T 7/0004 |
| 2017/0323468 A1* | 11/2017 | Conn | G06T 13/80 |
| 2017/0344248 A1* | 11/2017 | Oikawa | G06F 3/1454 |
| 2017/0344256 A1* | 11/2017 | Gnedin | G06F 40/134 |
| 2017/0344612 A1* | 11/2017 | Seyfert | G06F 16/2471 |
| 2018/0018774 A1 | 1/2018 | Kacher et al. | |
| 2019/0318728 A1* | 10/2019 | Sherman | G06F 3/0488 |
| 2019/0370594 A1 | 12/2019 | Gur et al. | |
| 2020/0097166 A1 | 3/2020 | Takano | |
| 2020/0183506 A1 | 6/2020 | Tamura | |
| 2021/0141829 A1* | 5/2021 | Bak | G06V 10/95 |
| 2021/0142423 A1* | 5/2021 | Randall | G06F 3/04886 |

FOREIGN PATENT DOCUMENTS

| | | |
|---|---|---|
| JP | 2020-052645 A | 4/2020 |
| JP | 2020-091629 A | 6/2020 |
| KR | 10-1996-0042307 A | 12/1996 |
| KR | 10-2010-0006649 A | 1/2010 |
| KR | 10-2014-0105385 A | 9/2014 |
| KR | 10-2014-0110556 A | 9/2014 |
| KR | 10-2015-0024170 A | 3/2015 |
| KR | 10-2015-0083602 A | 7/2015 |
| KR | 10-2015-0121483 A | 10/2015 |
| KR | 10-2016-0064560 A | 6/2016 |
| KR | 10-2017-0139141 A | 12/2017 |
| WO | 2017/069001 A1 | 4/2017 |

OTHER PUBLICATIONS

Korean Office Action dated Dec. 12, 2024, issued in Korean Application No. 10-2020-0177108.

Korean Office Action dated May 12, 2025, issued in a Korean Application No. 10-2020-0177108.

* cited by examiner

| Stroke (corresponding handwriting input) | Slope for preceding handwriting input | |
|---|---|---|
| 4th stroke (d) | 30 | ~312 |
| 5th stroke (e) | -30 | ~322 |
| 6th stroke (f)<br>7th stroke (f) | -21 }<br>-19 } Average: -20 | ~332 |
| 8th stroke (g) | -10 | ~342 |
| 9th stroke (h) | -15 | |

ELECTRONIC DEVICE FOR PROCESSING HANDWRITING INPUT, AND OPERATION METHOD THEREFOR

CROSS-REFERENCE TO RELATED APPLICATION(S)

This application is a continuation application of prior application Ser. No. 18/324,628, filed on May 26, 2023, which has issued as U.S. Pat. No. 12,002,275 on Jun. 4, 2024, which is a U.S. National Stage application under 35 U.S.C. § 371 of an International application number PCT/KR2021/017864, filed on Nov. 30, 2021, which is based on and claims the benefit of a Korean patent application number 10-2020-0177108, filed on Dec. 17, 2020, in the Korean Intellectual Property Office, the disclosure of which is incorporated by reference herein in its entirety.

BACKGROUND

1. Field

The disclosure relates to a method and device for distinguishing blocks corresponding to handwriting inputs based on a slope of the handwriting inputs and processing the handwriting inputs in units of the blocks.

2. Description of Related Art

Recently, use of portable electronic devices, such as smartphones, tablet PCs, or wearable devices is increasing. Users may make use of various functions using various input means, such as fingers or input tools, e.g., stylus pens.

Input using a stylus pen enables more accurate touch input than using a finger and may be useful for executing memo or sketch applications. Further, content creating method through handwriting input provides a higher degree of freedom in creating content, enables more intuitive and rapid input, and increase its usability due to enhanced character recognition technology.

The above information is presented as background information only to assist with an understanding of the disclosure. No determination has been made, and no assertion is made, as to whether any of the above might be applicable as prior art with regard to the disclosure.

SUMMARY

When distinguishing blocks corresponding to handwriting inputs using the average distance between the handwriting inputs, block division is difficult for handwriting inputs having a short average distance but a large slope difference therebetween. Thus, it may be hard to correctly perform per-block processing (e.g., text data conversion or block rotation) using the blocks. Further, a handwriting input may not be intact when displayed, as it is, in the border position of the page.

Aspects of the disclosure are to address at least the above-mentioned problems and/or disadvantages and to provide at least the advantages described below. Accordingly, an aspect of the disclosure is to provide an electronic device that distinguishes blocks corresponding to handwriting inputs based on the slope between the handwriting inputs and processes the handwriting inputs based on the distinguished blocks.

Additional aspects will be set forth in part in the description which follows and, in part, will be apparent from the description, or may be learned by practice of the presented embodiments.

In accordance with an aspect of the disclosure, an electronic device is provided. The electronic device includes a display and at least one processor. The at least one processor is configured to identify a first slope between a first handwriting input displayed on the display and a first preceding handwriting input preceding the first handwriting input, wherein the first handwriting input corresponds to a first block, identify a second slope between a second handwriting input displayed on the display and a second preceding handwriting input preceding the second handwriting input, wherein the second handwriting input is a handwriting input continuous to the first handwriting input, determine whether the second handwriting input corresponds to the first block or corresponds to a second block different from the first block, using the first slope and the second slope, and perform at least one operation for processing a plurality of handwriting inputs indicating the second block, based on the second handwriting input corresponding to the second block.

In accordance with another aspect of the disclosure, a method for operating an electronic device is provided. The method includes identifying a first slope between a first handwriting input displayed on a display of the electronic device and a first preceding handwriting input preceding the first handwriting input, wherein the first handwriting input corresponds to a first block, identifying a second slope between a second handwriting input displayed on the display and a second preceding handwriting input preceding the second handwriting input, wherein the second handwriting input is a handwriting input continuous to the first handwriting input, determining whether the second handwriting input corresponds to the first block or corresponds to a second block different from the first block, using the first slope and the second slope, and performing at least one operation for processing a plurality of handwriting inputs indicating the second block, based on the second handwriting input corresponding to the second block.

According to various embodiments, the electronic device may distinguish blocks corresponding to handwriting inputs considering the slope between the handwriting inputs as well as the distance between the handwriting inputs to further enhance the accuracy of processing handwriting inputs based on blocks (e.g., display position change, text data conversion, or display after rotation).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
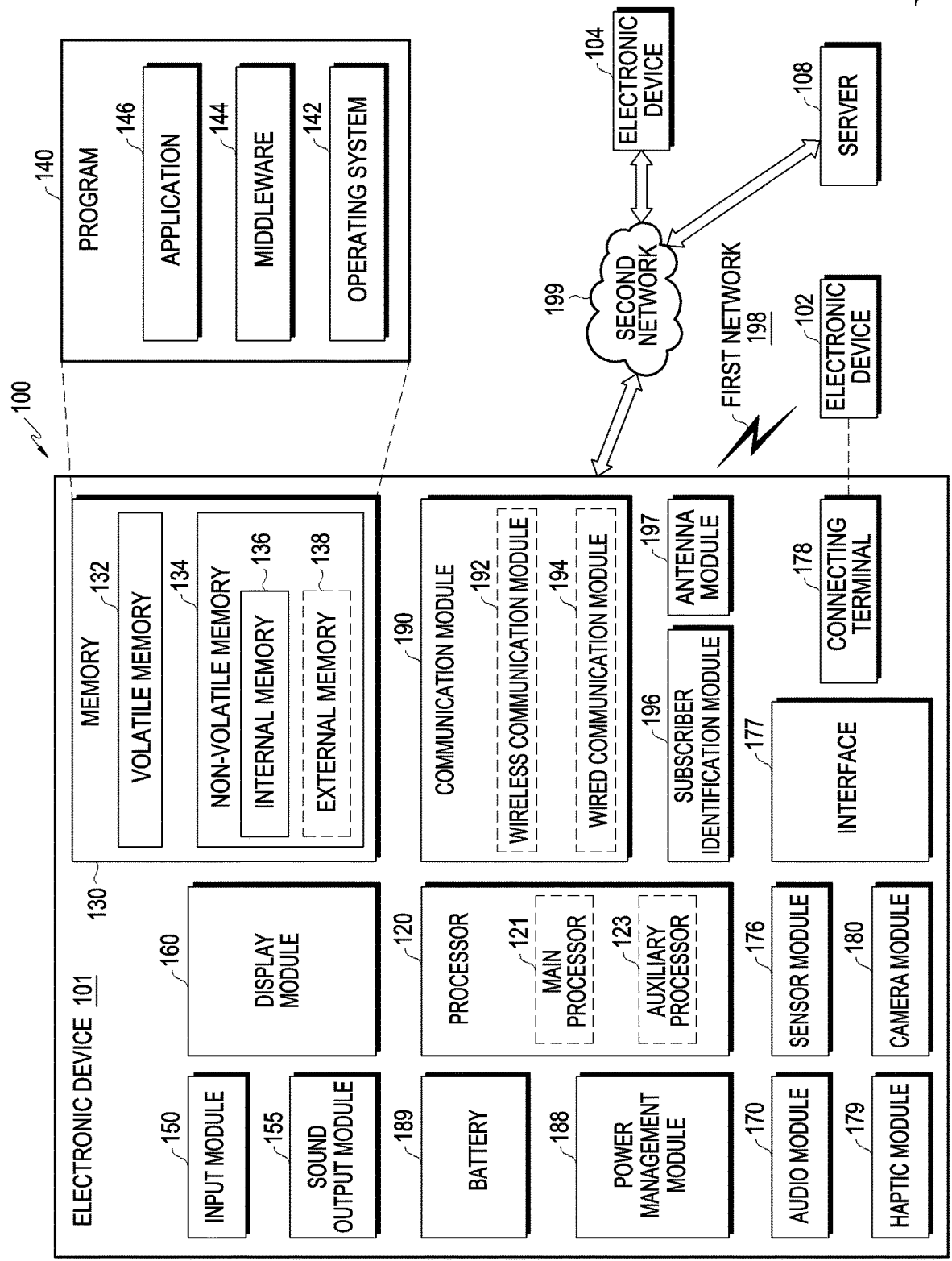
FIG. 1 is a block diagram illustrating an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
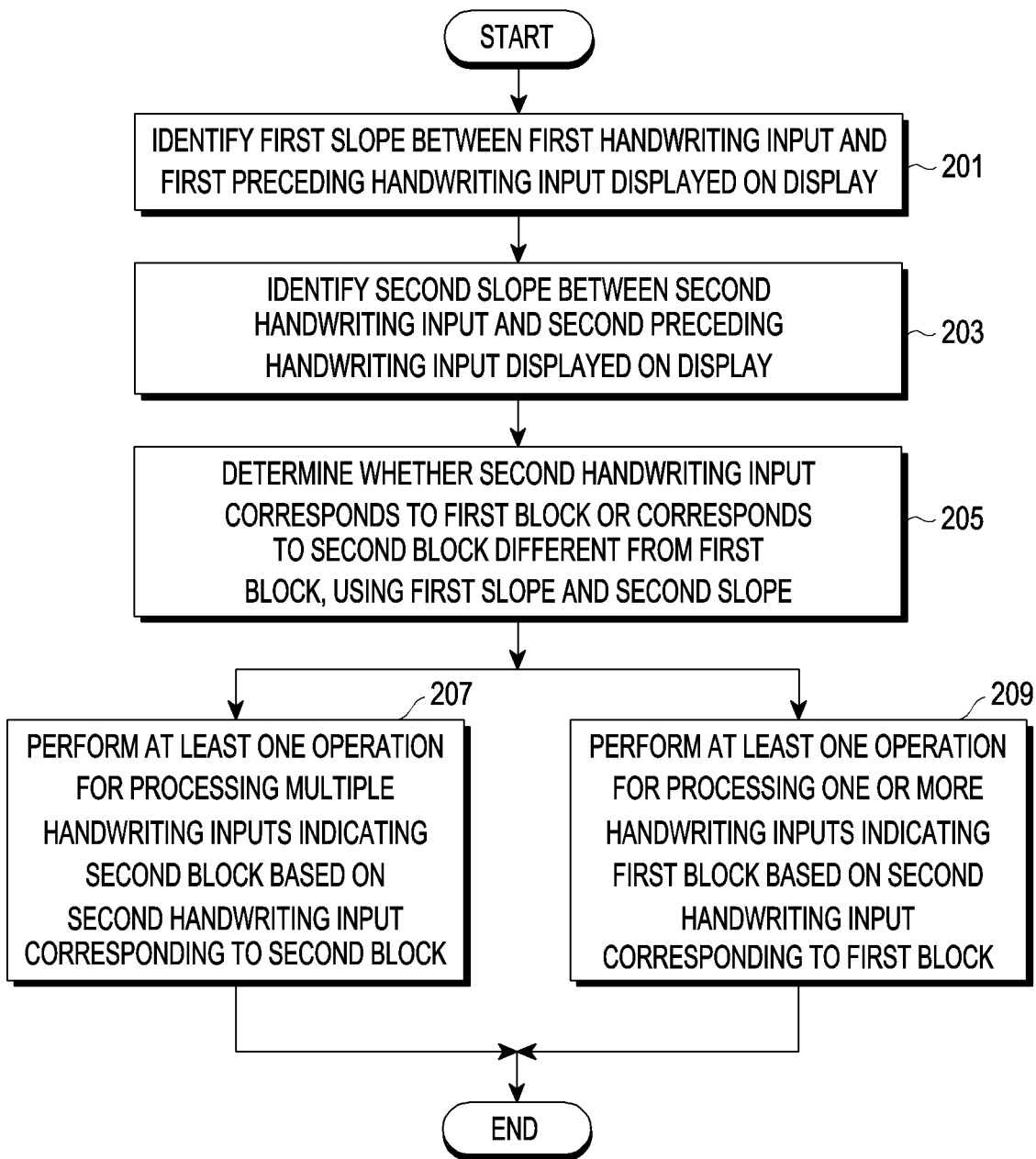
FIG. 2 is a flowchart illustrating a method for identifying a block corresponding to a handwriting input and processing the identified block by an electronic device according to an embodiment of the disclosure.

FIG. 2 is a flowchart illustrating a method for identifying a block corresponding to a handwriting input and processing the identified block by an electronic device (e.g., the electronic device 101 of FIG. 1) according to an embodiment of the disclosure.

Figure 3A:
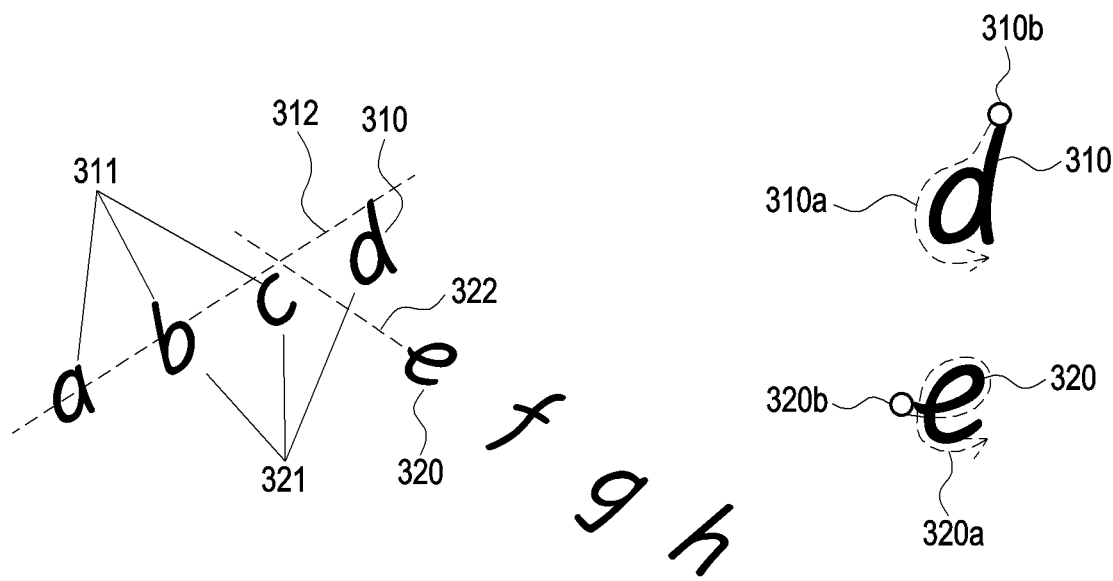
FIG. 3A illustrates an embodiment for identifying a block corresponding to each handwriting input based on the slope between handwriting inputs by an electronic device according to an embodiment of the disclosure.
Figure 3B:
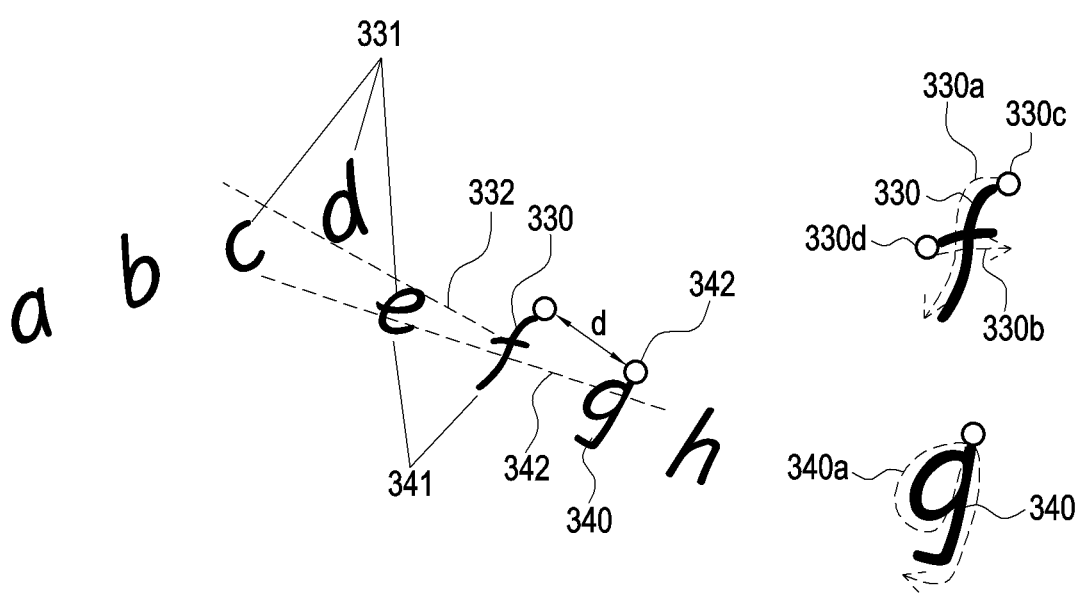
FIG. 3B illustrates a first embodiment of distinguishing blocks using the distance between handwriting inputs and the difference in slope between the handwriting inputs by an electronic device according to an embodiment of the disclosure.
Figures 3C, 3D:
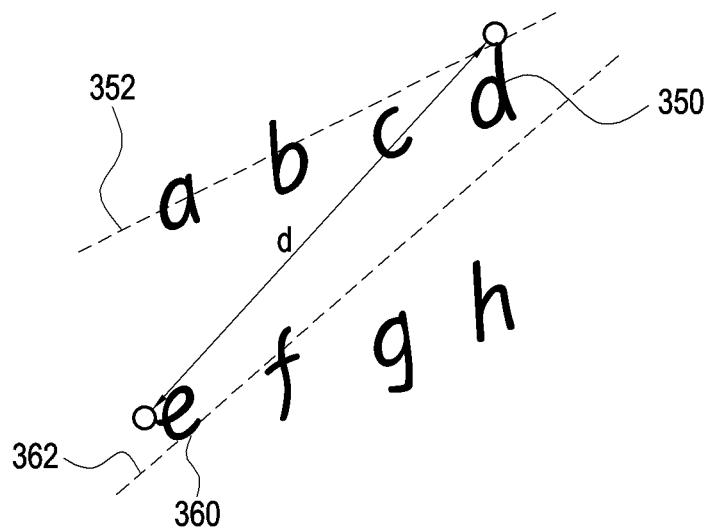
FIG. 3C illustrates slope information corresponding to each stroke of a handwriting input according to an embodiment of the disclosure.
FIG. 3D illustrates a second embodiment representing the operation of distinguishing blocks using the distance between handwriting inputs and the difference in slope between the handwriting inputs by an electronic device according to an embodiment of the disclosure.

FIG. 3A illustrates an embodiment for identifying a block corresponding to each handwriting input based on the slope between handwriting inputs by an electronic device according to an embodiment of the disclosure. FIG. 3B illustrates a first embodiment of distinguishing blocks using the distance between handwriting inputs and the difference in slope between the handwriting inputs by an electronic device according to an embodiment of the disclosure. FIG. 3C illustrates slope information corresponding to each stroke of a handwriting input according to an embodiment of the disclosure. FIG. 3D illustrates a second embodiment of distinguishing blocks using the distance between handwriting inputs and the difference in slope between the handwriting inputs by an electronic device 101 according to an embodiment of the disclosure.

Referring to FIG. 2, in operation 201, according to various embodiments, the electronic device 101 (e.g., the processor 120 of FIG. 1) may identify a first slope between a first handwriting input displayed on the display (e.g., the display module 160 of FIG. 1) and a first preceding handwriting input preceding the first handwriting input. The preceding handwriting input may mean a handwriting input obtained before obtaining a specific handwriting input. For example, referring to FIG. 3A, upon identifying the continuously written handwriting input 'abcdefgh,' the electronic device 101 may identify the first preceding handwriting input 311 (e.g., at least part of 'abc') as a handwriting input obtained before obtaining the first handwriting input 310 (e.g., 'd'). According to an embodiment, the electronic device 101 may identify the handwriting input obtained through the user's finger or a stylus pen interworking with the electronic device 101 and display the identified handwriting input on the display 160. The handwriting input may be constituted of at least one stroke, and each stroke may be data constituted of a plurality of points generated by the user input of touching down, dragging, and touching up the display 160 using the user's finger or stylus pen. For example, referring to FIG. 3A, 'a,' 'b,' and 'c' may be written by a single stroke, and 'f' may be written by two strokes. According to an embodiment, the electronic device 101 may recognize the handwriting input by obtaining position information (e.g., coordinate value) about the pixels indicating the handwriting input among the pixels of the display 160, but the method for recognizing the handwriting input may not be limited thereto.

According to various embodiments, the electronic device 101 (e.g., the processor 120 of FIG. 1) may identify a first slope between the first handwriting input and the first preceding handwriting input by calculating the average slope between the plurality of strokes constituting the first preceding handwriting input and at least one stroke constituting the first handwriting input. For example, referring to FIGS. 3A and 3B, the electronic device 101 may calculate the average slope (e.g., 30 degrees) between the plurality of strokes constituting the first preceding handwriting input 311 (e.g., 'abc') and one stroke 310a constituting the first handwriting input 310 (e.g., 'd') and identify the calculated average slope as a first slope 312 between the first handwriting input 310 and the first preceding handwriting input 311. As another example, referring to FIGS. 3B and 3C, the electronic device 101 may calculate the average slope (e.g., −20 degrees) between the plurality of strokes constituting a first preceding handwriting input 331 (e.g., 'cde') and two strokes 330a and 330b constituting the first handwriting input 330 (e.g., 'f') and identify the calculated average slope as a first slope 332 between the first handwriting input 330 and the first preceding handwriting input 331. According to an embodiment, the electronic device 101 may identify the first slope using the initial point of each stroke of the first preceding handwriting input and the first handwriting input. For example, referring to FIG. 3A, the electronic device 101 may identify the first slope 312 that corresponds to the average of the slopes between the respective initial points of the strokes constituting the first preceding handwriting input 311 and the initial point 310b of the stroke 310a constituting the first handwriting input 310. As another example, referring to FIG. 3B, the electronic device 101 may identify the first slope 332 that corresponds to the average of the slopes between the respective initial points of the strokes constituting the first preceding handwriting input 331 and the respective initial points 330c and 330d of the strokes 330a and 330b constituting the first handwriting input 330. According to an embodiment, the preceding handwriting input of a specific handwriting input may be constituted of a predetermined number of strokes selected from among strokes received before the specific handwriting input. For example, referring to FIG. 3A, the first preceding handwriting input 311 may be constituted of a predetermined number (e.g., about 3) of strokes (e.g., 'abc') selected from among the strokes received before the first handwriting input 310 (e.g., 'd'). According to an embodiment, the preceding handwriting input of the specific handwriting input may be constituted of a predetermined number (e.g., about 3) of strokes selected from among the strokes received until a predetermined time (e.g., about 3 seconds) before the time of reception of the specific handwriting input. According to an embodiment, the preceding handwriting input of the specific handwriting input may be constituted of a predetermined number (e.g., about 3) of strokes selected from among the strokes positioned within a predetermined distance (e.g., about 20 pixels) from the specific handwriting input and received before the specific handwriting input. The strokes received before the specific handwriting input may mean strokes selected in order from the latest reception before the time of receiving the specific handwriting input.

In operation 203, according to various embodiments, the electronic device 101 (e.g., the processor 120 of FIG. 1) may identify a second slope between a second handwriting input displayed on the display 160 and a second preceding handwriting input preceding the second handwriting input. The second handwriting input may be a handwriting input continuous to the first handwriting input. For example, referring to FIG. 3A, a second handwriting input 320 (e.g., 'e') may be a handwriting input obtained continuously after obtaining the first handwriting input 310 (e.g., 'd').

According to various embodiments, the electronic device 101 (e.g., the processor 120 of FIG. 1) may identify a second slope between the second handwriting input and the second preceding handwriting input by calculating the average slope between the plurality of strokes constituting the second preceding handwriting input and at least one stroke constituting the second handwriting input. For example, referring to FIGS. 3A and 3C, the electronic device 101 may calculate the average slope (e.g., −30 degrees) between the plurality of strokes constituting the second preceding handwriting input 321 (e.g., 'bcd') and one stroke 320a constituting the second handwriting input 320 (e.g., 'e') and identify the calculated average slope as a second slope 322 between the second handwriting input 320 and the second preceding handwriting input 321. In this case, the second preceding handwriting input 321 may be constituted of a predetermined number (e.g., about 3) of strokes (e.g., 'bcd') selected from among the strokes received before the second handwriting input 320 (e.g., 'e'). As another example, referring to FIGS. 3B and 3C, the electronic device 101 may calculate the average slope (e.g., −10 degrees) between the plurality of strokes constituting the second preceding handwriting input 341 (e.g., 'ef') and one stroke 340a constituting the second handwriting input 340 (e.g., 'g') and identify the calculated average slope as the second slope 342 between the second handwriting input 340 and the second preceding handwriting input 341. In this case, the second preceding handwriting input 341 may be constituted of a predetermined number (e.g., about 3) of strokes (e.g., 'ef') selected from among the strokes received before the second handwriting input 340 (e.g., 'g'). According to an embodiment, the electronic device 101 may identify the second slope using the initial point of each stroke of the second preceding handwriting input and the second handwriting input. For example, referring to FIG. 3A, the electronic device 101 may identify the second slope 322 that corresponds to the average of the slopes between the respective initial points of the strokes constituting the second preceding handwriting input 321 (e.g., 'bcd') and the initial point 320b of the stroke 320a constituting the second handwriting input 320 (e.g., 'e').

In operation 205, according to various embodiments, the electronic device 101 (e.g., the processor 120 of FIG. 1) may determine whether the second handwriting input corresponds to a first block or corresponds to a second block different from the first block, using the first slope and the second slope. The electronic device 101 is assumed to have already identified the result that the first handwriting input corresponds to the first block, using preceding handwriting inputs of the first handwriting input. According to an embodiment, the electronic device 101 may determine whether the second handwriting input corresponds to the first block or corresponds to the second block, based on a user input to move the second handwriting input to a border of a page in a memo application. According to an embodiment, the electronic device 101 may determine whether the second handwriting input included in a specific document corresponds to the first block or corresponds to the second block, based on a user input to request to convert the format of the specific document from a first format (e.g., borderless page) to a second format (e.g., bordered page).

According to various embodiments, the electronic device 101 (e.g., the processor 120 of FIG. 1) may determine that the second handwriting input corresponds to the second block different from the first block, based on the difference in slope between the first slope and the second slope exceeding a predetermined first value. For example, referring to FIG. 3A, the electronic device 101 may determine that the second handwriting input 320 corresponds to the second block different from the first block corresponding to the first handwriting input 310, based on the slope difference (e.g., 60 degrees) between the first slope 312 (e.g., 30 degrees) and the second slope 322 (e.g., −30 degrees) exceeding the predetermined first value (e.g., about 40 degrees). According to an embodiment, the predetermined first value may be set by the manufacturer of the electronic device 101 or the user of the electronic device 101 and may be a reference value for distinguishing blocks at a point where the slope between handwriting inputs is significantly changed.

According to various embodiments, the electronic device 101 (e.g., the processor 120 of FIG. 1) may identify the first distance between the first handwriting input and the second handwriting input and determine whether the first distance exceeds a predetermined second value. According to an embodiment, the predetermined second value may be set by the user or the manufacturer of the electronic device 101. According to an embodiment, the predetermined second value may be calculated by training an artificial intelligence model for distinguishing blocks with the distances between handwriting inputs where blocks are distinguished. According to an embodiment, the electronic device 101 may identify the first distance using the initial points of the respective strokes of the first handwriting input and the second handwriting input. According to an embodiment, the electronic device 101 may determine that the second handwriting input corresponds to the first block, based on (1) the difference in slope between the first slope and the second slope being the predetermined first value or less, and (2) the first distance between the first handwriting input and the second handwriting input being the predetermined second value or less. For example, referring to FIG. 3B, the electronic device 101 may determine that the second handwriting input 340 corresponds to the first block, like the first handwriting input 330, based on (1) the slope difference (e.g., 10 degrees) between the first slope 332 (e.g., −20 degrees) and the second slope 342 (e.g., −10 degrees) being the predetermined first value (e.g., about 40 degrees), and (2) the first distance d (e.g., about 10 pixels) between the first handwriting input 330 and the second handwriting input 340 being the predetermined second value (e.g., 40 pixels) or less. According to an embodiment, the electronic device 101 may determine that the second handwriting input corresponds to the second block different from the first block, based on (1) the slope difference between the first slope and the second slope being the predetermined first value or less, and (2) the first distance between the first handwriting input and the second handwriting input exceeding the predetermined second value. For example, referring to FIG. 3D, the electronic device 101 may determine that the second handwriting input 340 corresponds to the second block different from the first block corresponding to a first handwriting input 350, based on (1) the slope difference (e.g., 20 degrees) between a first slope 352 (e.g., 30 degrees) and a second slope 362 (e.g., 50 degrees) being the predetermined first value (e.g., about 40 degrees), and (2) the first distance d (e.g., 60 pixels) between the first handwriting input 350 (e.g., 'd') and a second handwriting input 360 (e.g., 'e')

exceeding the predetermined second value (e.g., about 40 pixels). According to an embodiment, the electronic device 101 may perform operations 201 to 205 in real-time while receiving the handwriting input through the memo application, thereby identifying the block corresponding to each handwriting input. According to an embodiment, the electronic device 101 may identify the block corresponding to each handwriting input in a specific memo by performing operations 201 to 205 based on loading the specific memo by the user's selection among a plurality of memos stored in the memo application. According to an embodiment, the electronic device 101 may perform operations 201 to 205 based on selection of some handwriting inputs from among handwriting inputs written through the memo application or a change in the display position of the selected handwriting inputs, thereby identifying the blocks corresponding to the selected handwriting inputs.

In operation 207, according to various embodiments, the electronic device 101 (e.g., the processor 120 of FIG. 1) may perform at least one operation for processing a plurality of handwriting inputs indicating the second block based on the second handwriting input corresponding to the second block. According to an embodiment, at least one operation for processing a plurality of handwriting inputs indicating the second block may include the operation of changing the display position of the plurality of handwriting inputs included in the second block, the operation of converting the plurality of handwriting inputs included in the second block into text data, and the operation of rotating and displaying the plurality of handwriting inputs included in the second block. A detailed description of the above-described operations is given below.

In operation 209, according to various embodiments, the electronic device 101 (e.g., the processor 120 of FIG. 1) may perform at least one operation for processing one or more handwriting inputs indicating the first block based on the second handwriting input corresponding to the first block. According to an embodiment, at least one operation for processing a plurality of handwriting inputs indicating the first block may include the operation of changing the display position of one or more handwriting inputs included in the first block, the operation of converting the one or more handwriting inputs included in the first block into text data, and the operation of rotating and displaying the one or more handwriting inputs included in the first block.

Figure 4:
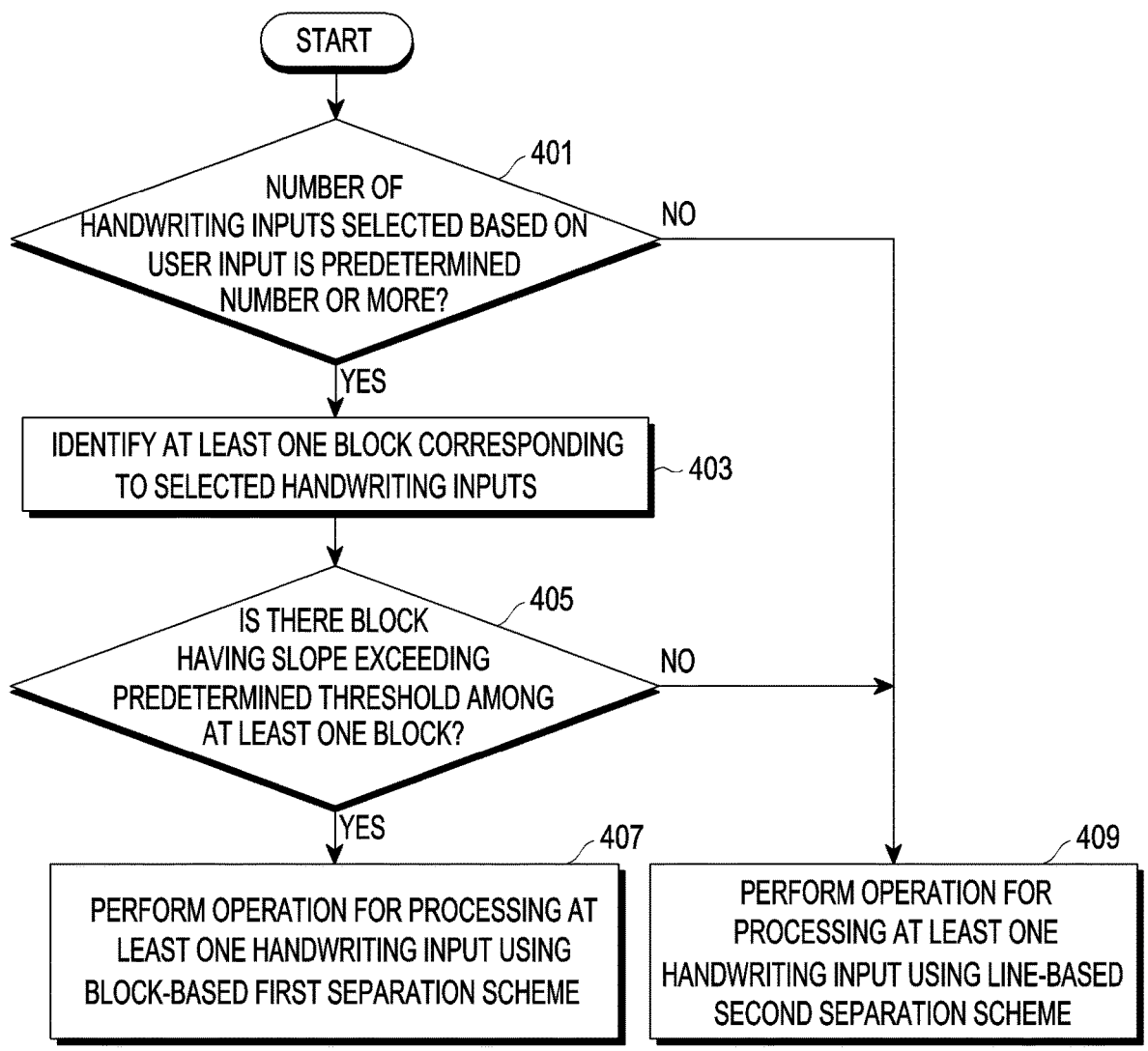
FIG. 4 is a flowchart illustrating a method for identifying a block corresponding to a handwriting input and processing the identified block by an electronic device according to an embodiment of the disclosure.

FIG. 4 is a flowchart illustrating a method for identifying a block corresponding to a handwriting input and processing the identified block by an electronic device (e.g., the electronic device 101 of FIG. 1) according to an embodiment of the disclosure.

Figure 5A:
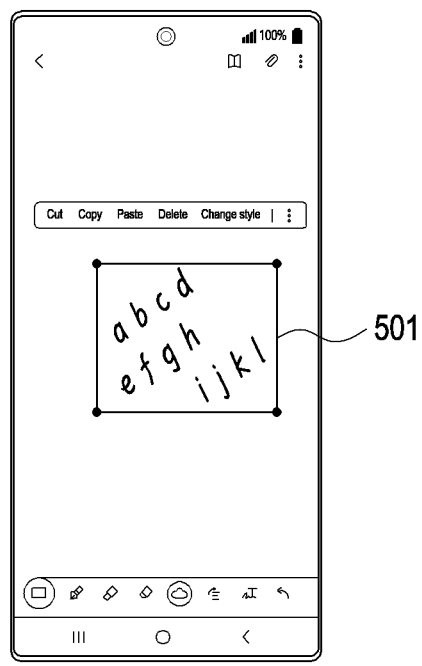
FIG. 5A illustrates an embodiment of identifying at least one block corresponding to handwriting inputs selected based on a user input by an electronic device according to an embodiment of the disclosure.
Figure 5B:
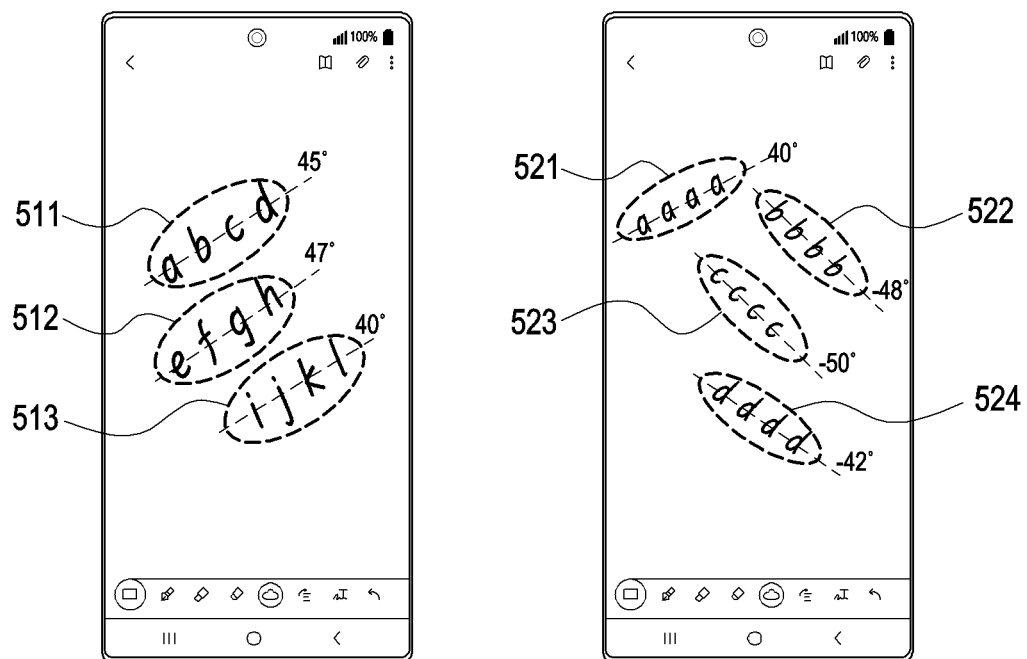
FIG. 5B illustrates an embodiment of identifying the slope of at least one block by an electronic device according to an embodiment of the disclosure.

FIG. 5A illustrates an embodiment of identifying at least one block corresponding to handwriting inputs selected based on a user input by an electronic device 101 according to an embodiment of the disclosure. FIG. 5B illustrates an embodiment of identifying the slope of at least one block by an electronic device 101 according to an embodiment of the disclosure.

Referring to FIG. 4, in operation 401, according to various embodiments, the electronic device 101 (e.g., the processor 120 of FIG. 1) may identify whether the number of handwriting inputs selected based on a user input is a predetermined number or more. According to an embodiment, the electronic device 101 may receive a user input for selecting handwriting inputs and determine whether the number of the selected handwriting inputs (e.g., strokes) is a predetermined number or more. For example, referring to FIG. 5A, upon receiving an input for selecting a handwriting input (e.g., "abcdefghijkl") from the user, the electronic device 101 may display a graphic element 501 indicating the area corresponding to the selected handwriting input and determine whether the number of the selected handwriting inputs is a predetermined number or more. This is why handwriting inputs constituted of a specific number of strokes or less need not be distinguished for blocks.

In operation 403, according to various embodiments, the electronic device 101 (e.g., the processor 120 of FIG. 1) may identify at least one block corresponding to the selected handwriting inputs. According to an embodiment, the electronic device 101 may identify at least one block corresponding to the selected handwriting inputs based on the number of handwriting inputs selected based on the user input being the predetermined number or more. According to an embodiment, the electronic device 101 may designate a predetermined number of handwriting inputs continuous from the initial handwriting input to correspond to the initial block (original block). For example, referring to FIG. 5A, the electronic device 101 may designate a predetermined number (e.g., about 3) of handwriting inputs (e.g., 'abc') continuous from the initial handwriting input (e.g., 'a') to correspond to the first block as the initial block. According to an embodiment, the electronic device 101 may determine whether a specific handwriting input among the selected handwriting inputs corresponds to a block different from the block corresponding to the preceding handwriting input. The above-described operations may be performed using operations 201 to 205 of FIG. 2. According to an embodiment, the electronic device 101 may sequentially identify the blocks respectively correspond to the selected handwriting inputs. For example, referring to FIG. 5A, the electronic device 101 may identify that a first specific handwriting input (e.g., 'd') corresponds to the same block as the block (e.g., first block) corresponding to the preceding handwriting input (e.g., 'c') using the distance and slope between the first specific handwriting input (e.g., 'd') and the preceding handwriting input (e.g., 'c'). As another example, referring to FIG. 5A, the electronic device 101 may identify that a second specific handwriting input (e.g., 'e') corresponds to a block (e.g., second block) different from the block (e.g., first block) corresponding to the preceding handwriting input (e.g., 'd') using the distance and slope between the second specific handwriting input (e.g., 'e') and the preceding handwriting input (e.g., 'd'). As another example, referring to FIG. 5A, the electronic device 101 may identify that a third specific handwriting input (e.g., 'i') corresponds to a block (e.g., the third block) different from the block (e.g., second block) corresponding to the preceding handwriting input (e.g., 'h') using the distance and slope between the third specific handwriting input (e.g., 'i') and the preceding handwriting input (e.g., 'h'). As a result of the identification, the electronic device 101 may determine that 'abcd' corresponds to the first block, 'efgh' corresponds to the second block, and 'ijkl' corresponds to the third block.

In operation 405, according to various embodiments, the electronic device 101 (e.g., the processor 120 of FIG. 1) may determine whether there is a block having a slope exceeding a predetermined threshold among at least one block.

According to an embodiment, the electronic device 101 may calculate the slope of the at least one block. For example, referring to <510> of FIG. 5B, the electronic device 101 may calculate a first slope (e.g., 45 degrees) of a first block 511, a second slope (e.g., 47 degrees) of a second block 512, and a third slope (e.g., 40 degrees) of a third block 513, based on a linear regression scheme using the points constituting the handwriting input in the block. As another example, referring to <520> of FIG. 5B, the electronic device 101 may calculate a first slope (e.g., 40 degrees) of a first block 521, a second slope (e.g., −48 degrees) of a second block 522, a third slope (e.g., −50 degrees) of a third block 523, and a fourth slope (e.g., −42 degrees) of a fourth block 524.

According to an embodiment, the electronic device 101 may determine whether there is a block having a slope exceeding a predetermined threshold from the average slope of at least one block. For example, referring to <510> of FIG. 5B, the electronic device 101 may calculate the average slope (e.g., 44 degrees) of the first block 511 to the third block 513 and determine whether a slope deviation (e.g., 1 degree) of the first block 511, a slope deviation (e.g., 3 degrees) of the second block 512, and a slope deviation (e.g., 4 degrees) of the third block 513 exceed a predetermined threshold (e.g., 30 degrees). In this case, the electronic device 101 may identify that there is no block having the slope exceeding the predetermined threshold among the first block 511 to the third block 513. As another example, referring to <520> of FIG. 5B, the electronic device 101 may calculate the average slope (e.g., −25 degrees) of the first block 521 to the fourth block 524 and determine whether a slope deviation (e.g., 65 degrees) of the first block 521, a slope deviation (e.g., 23 degrees) of the second block 522, a slope deviation (e.g., 25 degrees) of the third block 523, and a slope deviation (e.g., 17 degrees) of the fourth block 524 exceed a predetermined threshold (e.g., about 30 degrees). In this case, the electronic device 101 may identify that there is a block (e.g., the first block 521) exceeding the predetermined threshold among the first block 521 to the fourth block 524. According to an embodiment, the electronic device 101 may determine whether a ratio of blocks having a slope exceeding the predetermined threshold to at least one block corresponding to the selected handwriting inputs is a predetermined ratio (e.g., about 10%).

In operation 407, according to various embodiments, the electronic device 101 (e.g., the processor 120 of FIG. 1) may perform an operation for processing at least one handwriting input using a block-based first separation scheme. According to an embodiment, the operation for processing at least one handwriting input using the block-based first separation scheme may mean the operation of processing at least one handwriting input included in the first block or second block identified according to each operation of FIG. 2. According to an embodiment, the electronic device 101 may perform the operation for processing at least one handwriting input, using the block-based first separation scheme, based on there being a block having a slope exceeding the predetermined threshold among the at least one block or the ratio of the blocks having the slope exceeding the predetermined threshold being the predetermined ratio or more. According to an embodiment, the electronic device 101 may perform the operation for processing at least one handwriting input, using the block-based first separation scheme, based on the ratio of the blocks having a slope exceeding the predetermined threshold to at least one block being the predetermined ratio or more.

In operation 409, according to various embodiments, the electronic device 101 (e.g., the processor 120 of FIG. 1) may perform an operation for processing at least one handwriting input using a line-based second separation scheme. According to an embodiment, the electronic device 101 may distinguish one line from the handwriting inputs by analyzing handwriting inputs selected by the user, using a machine learning-based document layout analysis (DLA) engine to distinguish lines of handwriting inputs. The operations processed based on units of blocks in the disclosure may also be applied to operations processed based on units of lines distinguished by the DLA engine.

According to an embodiment, the electronic device 101 may perform the operation for processing at least one handwriting input, using the line-based second separation scheme, based on there being no block having a slope exceeding the predetermined threshold among the at least one block or the ratio of the blocks having the slope exceeding the predetermined threshold being less than the predetermined ratio. According to an embodiment, upon determining that the number of handwriting inputs selected based on a user input being less than the predetermined number according to operation 401, the electronic device 101 may perform the operation for processing at least one handwriting input using the line-based second separation scheme.

Figure 6:
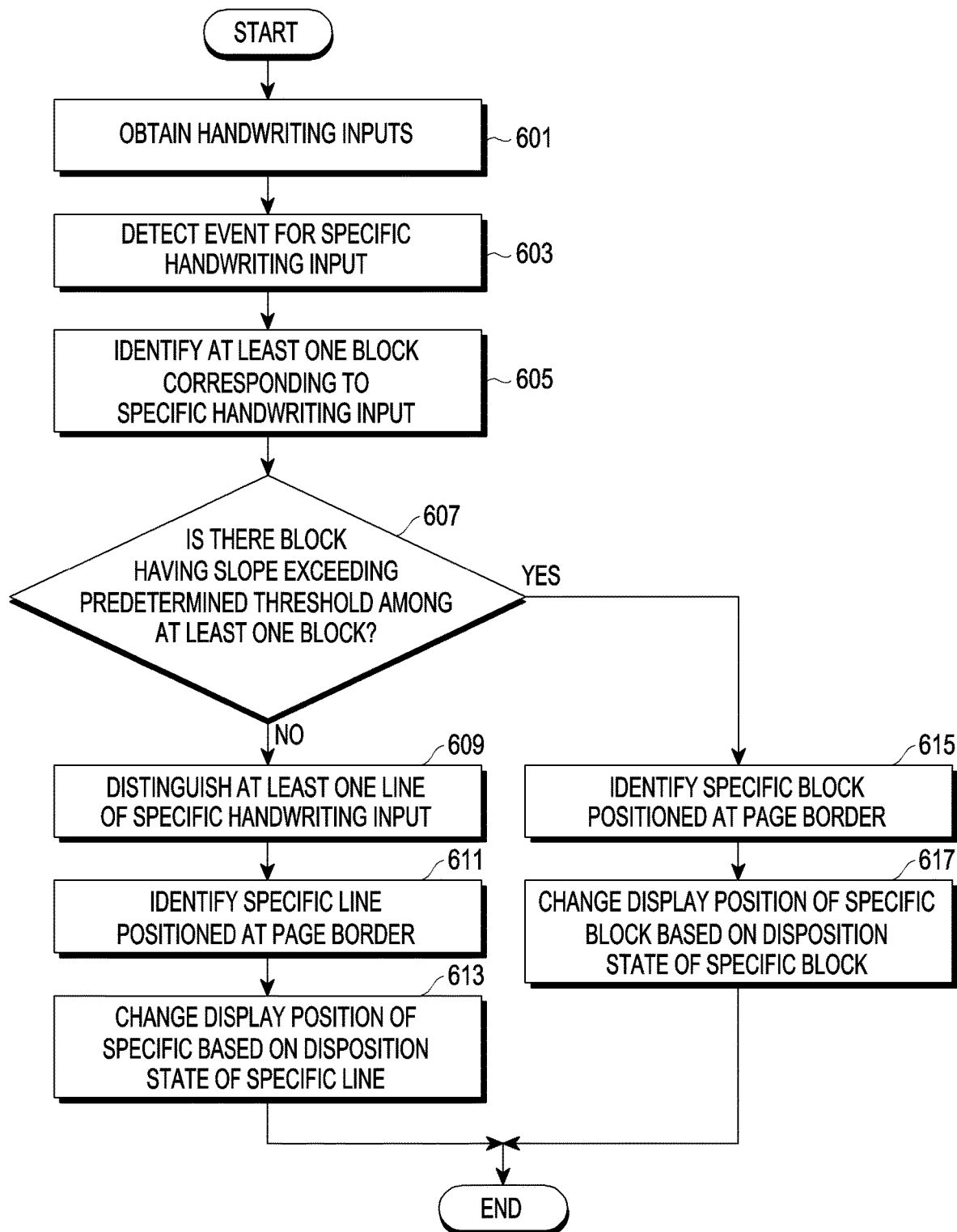
FIG. 6 is a flowchart illustrating a method for changing the display position of a handwriting input positioned at a border of a page by an electronic device according to an embodiment of the disclosure.
Figure 7:
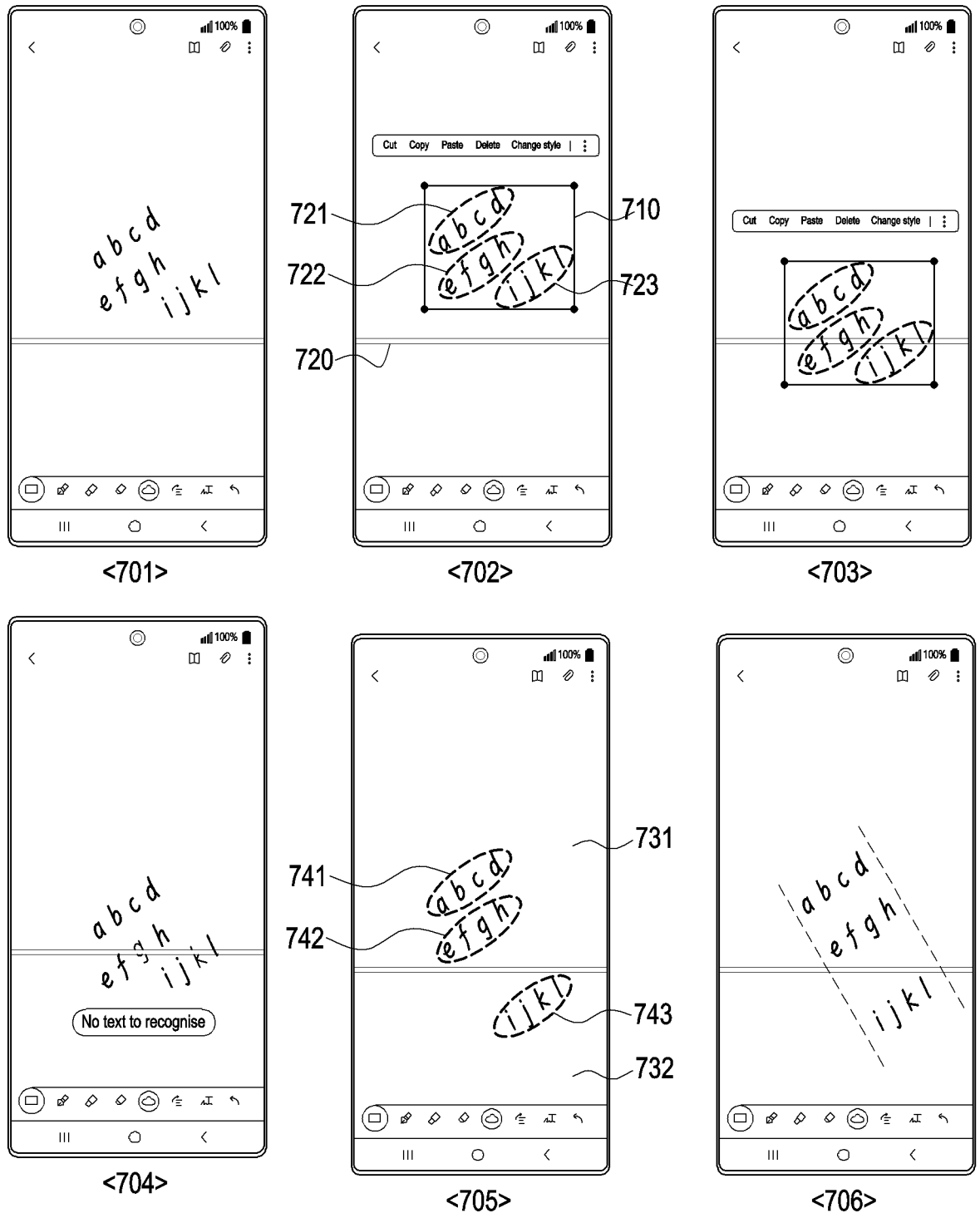
FIG. 7 is a view illustrating an embodiment of changing the display position of a handwriting input included in at least one line by an electronic device according to an embodiment of the disclosure.
Figure 8:
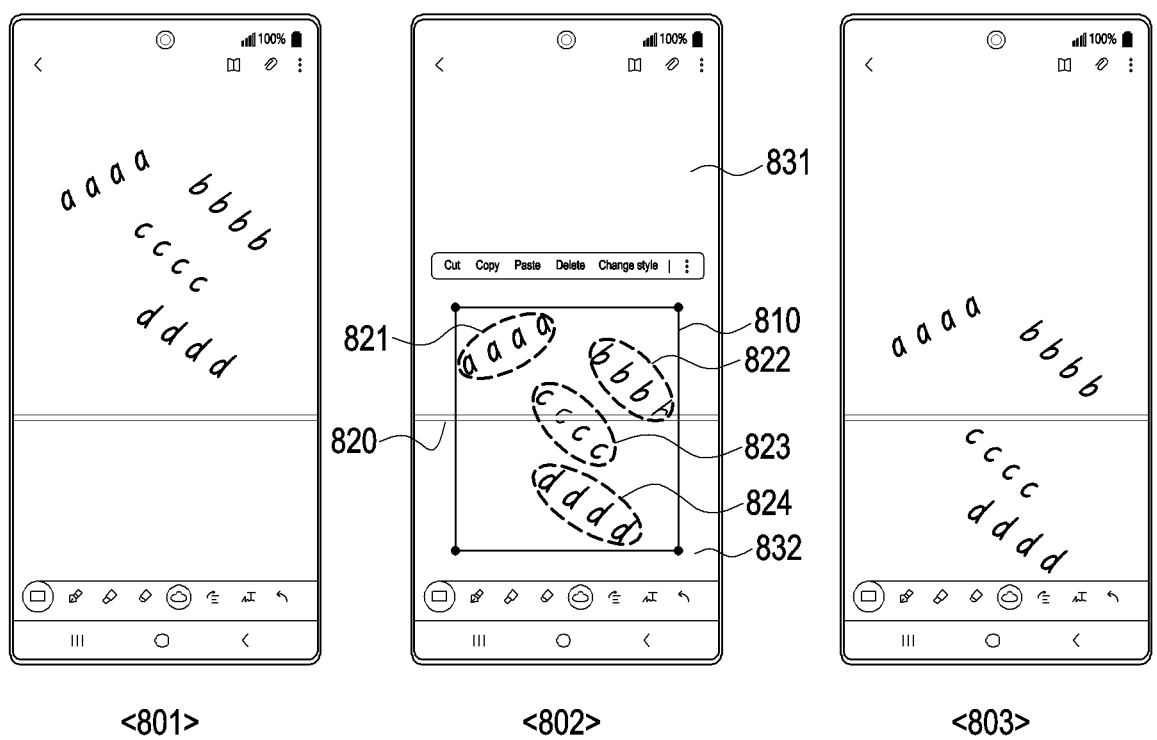
FIG. 8 is a view illustrating an embodiment of changing the display position of a handwriting input included in at least one block by an electronic device according to an embodiment of the disclosure.

FIG. 6 is a flowchart illustrating a method for changing the display position of a handwriting input positioned at a border of a page by an electronic device (e.g., the electronic device 101 of FIG. 1) according to an embodiment of the disclosure. FIG. 7 is a view illustrating an embodiment of changing the display position of a handwriting input included in at least one line by an electronic device 101 according to an embodiment of the disclosure. FIG. 8 is a view illustrating an embodiment of changing the display position of a handwriting input included in at least one block by an electronic device 101 according to an embodiment of the disclosure.

Referring to FIG. 6, in operation 601, according to various embodiments, the electronic device 101 (e.g., the processor 120 of FIG. 1) may obtain handwriting inputs from the user. For example, referring to <701> of FIG. 7, the electronic device 101 may obtain a handwriting input (e.g., 'abcdefghijkl') through the user's finger or a stylus pen while the memo application is running and display the obtained handwriting input on the display (e.g., the display module 160 of FIG. 1). As another example, referring to <801> of FIG. 8, the electronic device 101 may obtain a handwriting input (e.g., 'aaaa', 'bbbb', 'cccc', 'dddd') from the user and display the obtained handwriting input on the display 160.

In operation 603, according to various embodiments, the electronic device 101 (e.g., the processor 120 of FIG. 1) may detect an event for a specific handwriting input. According to an embodiment, the electronic device 101 may receive a first user input for selecting a specific handwriting input and a second user input for moving the selected handwriting input. For example, referring to <702> and <703> of FIG. 7, upon receiving the first user input for selecting the specific handwriting input (e.g., 'abcdefghijkl'), the electronic device 101 may display a graphic element 710 indicating the area corresponding to the selected handwriting input and receive the second user input for moving the selected handwriting input to a specific position (e.g., a page border 720) in the memo. As an example, referring to <802> of FIG. 8, upon receiving the first user input for selecting a specific handwriting input (e.g., 'aaaa,' 'bbbb,' 'cccc,' or 'dddd'), the electronic device 101 may display a graphic element 810 indicating the area corresponding to the selected handwriting input and receive the second user input for moving the selected handwriting input to a specific position (e.g., a page border 820) in the memo. According to an embodiment, the electronic device 101 may receive a second user input to move the selected handwriting input to overlap on another handwriting input.

In operation 605, according to various embodiments, the electronic device 101 (e.g., the processor 120 of FIG. 1) may identify at least one block corresponding to a specific handwriting input. The electronic device 101 may perform the operation of identifying at least one block corresponding to the specific handwriting input using the method described in connection with operation 403 of FIG. 4. According to an embodiment, the electronic device 101 may identify at least one block corresponding to the specific handwriting input in response to reception of the first user input for selecting the specific handwriting input. For example, referring to <702> of FIG. 7, the electronic device 101 may identify a first block 721 corresponding to 'abcd,' a second block 722 corresponding to 'efgh,' and a third block 723 corresponding to 'ijkl.' According to an embodiment, the electronic device 101 may identify at least one block corresponding to the specific handwriting input in response to reception of the second user input for moving the selected handwriting input. For example, referring to <802> of FIG. 8, the electronic device 101 may identify a first block 821 corresponding to 'aaaa,' a second block 822 corresponding to 'bbbb,' a third block 823 corresponding to 'cccc,' and a fourth block 824 corresponding to 'dddd.'

In operation 607, according to various embodiments, the electronic device 101 (e.g., the processor 120 of FIG. 1) may determine whether there is a block having a slope exceeding a predetermined threshold among at least one block. The electronic device 101 may perform the operation of determining whether there is a block having a slope exceeding a predetermined threshold using the method described in connection with operation 405 of FIG. 4. For example, referring to <702> of FIG. 7, the electronic device 101 may identify that there is no block having the slope exceeding the predetermined threshold among the first block 721 to the third block 723. As another example, referring to <802> of FIG. 8, the electronic device 101 may identify that there is a block (e.g., the first block 821) exceeding the predetermined threshold among the first block 821 to the fourth block 824.

In operation 609, according to various embodiments, the electronic device 101 (e.g., the processor 120 of FIG. 1) may distinguish at least one line of the specific handwriting input where an event is detected. According to an embodiment, the electronic device 101 may distinguish at least one line of the specific handwriting input where an event is detected, based on there being no block having a slope exceeding the predetermined threshold among the at least one block or the ratio of the blocks having the slope exceeding the predetermined threshold being less than the predetermined ratio. According to an embodiment, the electronic device 101 may separate at least one line from the specific handwriting input using an artificial intelligence model (e.g., DLA engine) for distinguishing the lines of the handwriting input. For example, referring to <702> of FIG. 7, the electronic device 101 may separate a first line (e.g., 'abcd'), a second line (e.g., 'efgh'), and a third line (e.g., 'ijkl') from the specific handwriting input using the DLA engine.

In operation 611, according to various embodiments, the electronic device 101 (e.g., the processor 120 of FIG. 1) may identify a specific line positioned at the page border among at least one line. According to an embodiment, the electronic device 101 may identify the specific line positioned at the page border in response to reception of the second user input. For example, referring to <703> of FIG. 7, the electronic device 101 may identify the second line (e.g., 'efgh') positioned at the page border.

In operation 613, according to various embodiments, the electronic device 101 (e.g., the processor 120 of FIG. 1) may change the display position of the specific line based on the disposition state of the specific line. If the handwriting input positioned at the page border is displayed as it is, the shape of the handwriting input (e.g., 'g') may not be intact as shown in <704> of FIG. 7. Thus, the electronic device 101 may change the display position of the handwriting input positioned at the page border to preserve the shape of the handwriting input. According to an embodiment, the electronic device 101 may identify the target page where the handwriting inputs included in the specific line are most disposed and change the display position of all the handwriting inputs included in the specific line to allow the specific line to be displayed in the target page. For example, referring to <703> and <704> of FIG. 7, the electronic device 101 may identify that handwriting inputs are disposed more in a first page 731 and a second page 732 of the memo application by analyzing the strokes of the handwriting input (e.g., 'efgh') included in the second line 742 and change the display position of all the handwriting inputs included in the second line 742 to the first page 731. According to an embodiment, the electronic device 101 may also change the display position of at least one preceding line preceding the specific line while changing the display position of the specific line. For example, referring to <705> of FIG. 7, the electronic device 101 may change the display position of a first line 741, preceding the second line 742, by the moving distance (e.g., +20 pixels in the y-axis direction) while changing the display position of the second line 742 to allow the whole second line 742 to be displayed in the first page 731. According to an embodiment, the electronic device 101 may change the display position of the specific line further based on the difference in distance between the specific line and the preceding/following line of the specific line. For example, referring to <706> of FIG. 7, the electronic device 101 may change the display position of the second line 742 by the distance obtained by multiplexing the difference in distance between the initial handwriting input (e.g., 'e') of the second line 742 and the initial handwriting input (e.g., 'i') of the third line 743 by a specific magnification to maintain the composition between the second line 742 and the third line 743 that is the following line of the second line. In this case, the electronic device 101 may change the display position of the first line 741 by the moving distance of the second line 742 while changing the display position of the second line 742.

In operation 615, according to various embodiments, the electronic device 101 (e.g., the processor 120 of FIG. 1) may identify a specific block positioned at the page border among at least one block. According to an embodiment, the electronic device 101 may identify a specific block positioned at the page border, based on there being a block having a slope exceeding the predetermined threshold among the at least one block or the ratio of the blocks having the slope exceeding the predetermined threshold being the predetermined ratio or more. According to an embodiment, the electronic device 101 may identify the specific block positioned at the page border in response to reception of the second user input. For example, referring to <802> of FIG. 8, the electronic device 101 may identify a second block 822 and a third block 823 positioned at the page border.

In operation 617, according to various embodiments, the electronic device 101 (e.g., the processor 120 of FIG. 1) may change the display position of the specific block based on the disposition state of the specific block positioned at the page border. According to an embodiment, the electronic device 101 may identify the target page where the handwriting inputs included in the specific block are most disposed and change the display position of all the handwriting inputs included in the specific block to allow the specific block to be displayed in the target page. For example, referring to <802> and <803> of FIG. 8, the electronic device 101 may analyze the strokes of the first handwriting input (e.g., 'bbbb') included in the second block 822 and the second handwriting input (e.g., 'cccc') included in the third block 823, thereby identifying that more first handwriting inputs are disposed in a first page 831 and a second page 832 of the memo application and more second handwriting inputs are disposed in the second page 832 and changing the display position of all the handwriting inputs included in the second block 822 to the first page 831 and changing the display position of all the handwriting inputs included in the third block 823 to the second page 832. According to an embodiment, the electronic device 101 may also change the display position of at least one preceding block preceding the specific block while changing the display position of the specific block. For example, referring to <803> of FIG. 8, the electronic device 101 may change the display position of the second block 822 to allow the entire second block 822 to be displayed in the first page 831 while changing the display position of the first block 821 preceding the second block 822 by the moving distance (e.g., +10 pixels in the y-axis direction) of the second block 822. According to an embodiment, the electronic device 101 may also change the display position of at least one following block of the specific block while changing the display position of the specific block. For example, referring to <803> of FIG. 8, the electronic device 101 may change the display position of the third block 823 to allow the entire third block 823 to be displayed in the second page 832 while changing the display position of the fourth block 824 following the third block 823 by the moving distance (e.g., −20 pixels in the y-axis direction) of the third block 823. According to an embodiment, the electronic device 101 may change the display position of the specific block further based on the difference in distance between the specific block and the preceding block of the specific block or the difference in distance between the specific block and the following block of the specific block.

Figure 9A:
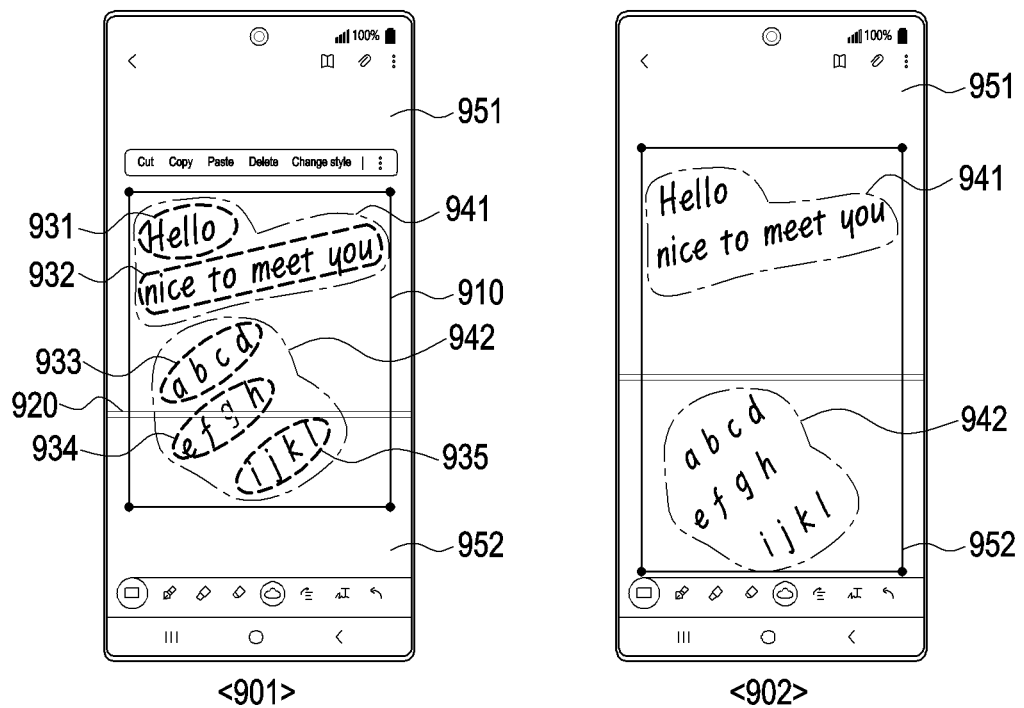
FIG. 9A illustrates an embodiment of changing the display position of a group based on the disposition state of the group including a block positioned at a border of a page by an electronic device according to an embodiment of the disclosure.

FIG. 9A illustrates an embodiment of changing the display position of a group based on the disposition state of the group including a block positioned at a border of a page by an electronic device (e.g., the electronic device 101 of FIG. 1) according to an embodiment of the disclosure.

According to various embodiments, the electronic device 101 (e.g., the processor 120 of FIG. 1) may receive a first user input for selecting a plurality of handwriting inputs and a second user input for moving the selected handwriting inputs. For example, referring to <901> of FIG. 9A, upon receiving the first user input for selecting a plurality of handwriting inputs (e.g., 'hello nice to meet you' and 'abcdefghijkl'), the electronic device 101 may display a graphic element 910 indicating the area corresponding to the selected handwriting input and receive the second user input for moving part of the selected handwriting input to a specific position (e.g., page border 920) in the memo.

According to various embodiments, the electronic device 101 (e.g., the processor 120 of FIG. 1) may identify a specific group including a block positioned at a page border. For example, referring to <901> of FIG. 9A, the electronic device 101 may identify that, of a first group 941 including a first block 931 and a second block 932 and a second group 942 including a third block 933, a fourth block 934, and a fifth block 935, the group corresponding to the third block 933 and the fourth block 934 positioned at the page border 920 is the second group 942. According to an embodiment, the electronic device 101 may distinguish the groups including the blocks based on the distance between the blocks exceeding a predetermined distance.

According to various embodiments, the electronic device 101 (e.g., the processor 120 of FIG. 1) may change the display position of a specific group based on the disposition state of the specific group including the block positioned at the page border. For example, referring to <901> and <902> of FIG. 9A, the electronic device 101 may identify that the second group 942 may be disposed more in a second page 952 of the first page 951 and the second page 952 of the memo application by analyzing the strokes of the handwriting inputs included in the second group 942 and change the display position of all the handwriting inputs included in the second group 942 to the second page 952. In this case, the electronic device 101 may maintain the display position of the first group 941 while changing the display position of the second group 942, based on the second page 952 corresponding to the changed display position of the second group 942 being different from the first page 951 corresponding to the display position of the first group 941.

Figure 9B:
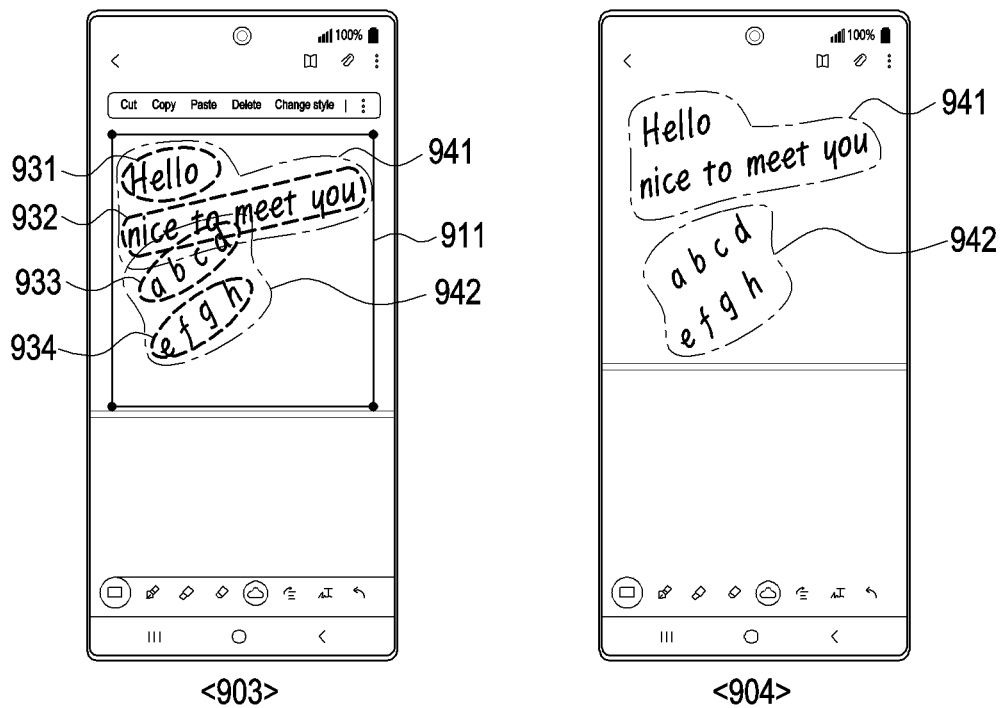
FIG. 9B illustrates an embodiment of changing the display position of a block positioned overlapping on another block by an electronic device according to an embodiment of the disclosure.

FIG. 9B illustrates an embodiment of changing the display position of a block positioned overlapping on another block by an electronic device (e.g., the electronic device 101 of FIG. 1) according to an embodiment of the disclosure.

According to various embodiments, the electronic device 101 (e.g., the processor 120 of FIG. 1) may receive a first user input for selecting a plurality of handwriting inputs and a second user input for moving the selected handwriting inputs. For example, referring to <903> of FIG. 9B, upon receiving the first user input for selecting a plurality of handwriting inputs (e.g., 'abcdefgh'), the electronic device 101 may display a graphic element 911 indicating the area corresponding to the selected handwriting input and receive the second user input for moving part of the selected handwriting input to a specific position (e.g., the display position of the second block 932) in the memo.

According to various embodiments, the electronic device 101 (e.g., the processor 120 of FIG. 1) may change the display position of the block positioned to overlap on another block. For example, referring to <903> and <904> of FIG. 9B, the electronic device 101 may change the display position of the third block 933 positioned to overlap on the second block 932 to another position not to overlap the second block 932. In this case, the electronic device 101 may change the display position of the fourth block 934 by the moving distance of the third block 933 while changing the display position of the third block 933.

Figure 10:
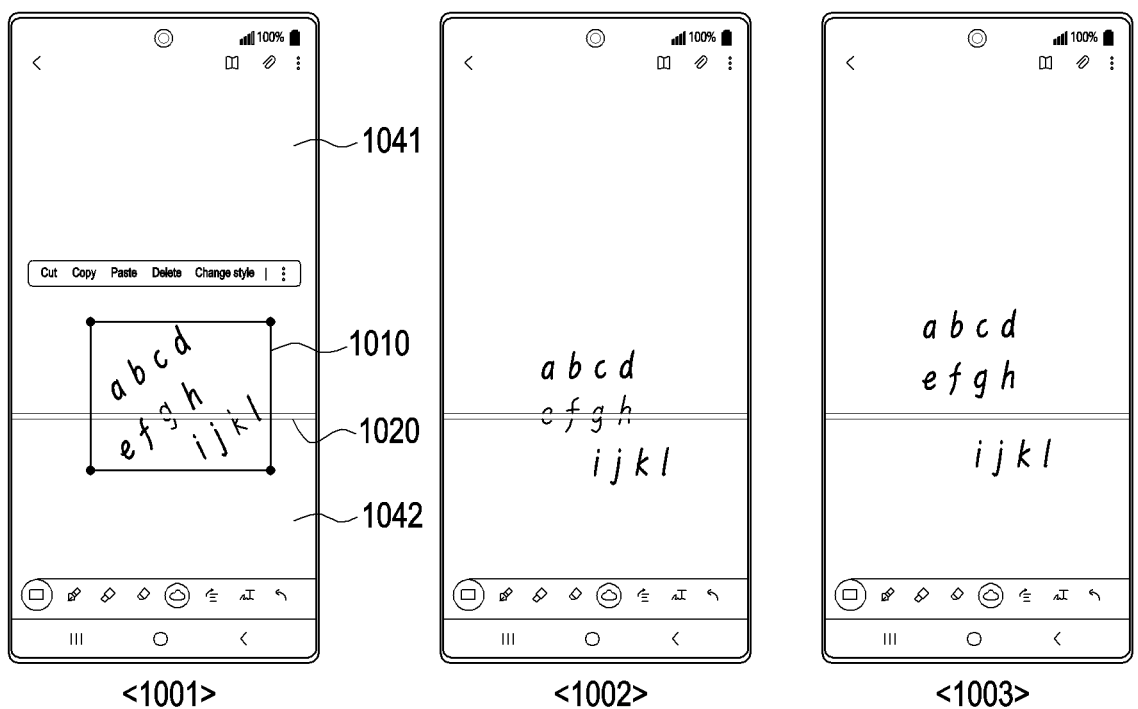
FIG. 10 illustrates an embodiment of changing the display position of a rotated specific block based on the disposition state of a specific block positioned at a border of a page by rotation by an electronic device according to an embodiment of the disclosure.

FIG. 10 illustrates an embodiment of changing the display position of a rotated specific block based on the disposition state of a specific block positioned at a border of a page by rotation by an electronic device (e.g., the electronic device 101 of FIG. 1) according to an embodiment of the disclosure.

According to various embodiments, the electronic device 101 (e.g., the processor 120 of FIG. 1) may receive a first user input for selecting a plurality of handwriting inputs and a second user input for rotating the selected handwriting inputs. For example, referring to <1001> of FIG. 10, upon receiving the first user input for selecting a plurality of handwriting inputs (e.g., 'abcdefghijkl'), the electronic device 101 may display a graphic element 1010 indicating the area corresponding to the selected handwriting input and receive the second user input for rotating the selected handwriting input.

According to various embodiments, the electronic device 101 (e.g., the processor 120 of FIG. 1) may identify the rotated specific block positioned at a page border. For example, referring to <1002> of FIG. 10, the electronic device 101 may identify the rotated second block 1032 (e.g., 'efgh') positioned at the page border 1020 after the rotation is performed. If the handwriting input positioned at the page border by the rotation is displayed as it is, the shape of the handwriting input (e.g., 'efgh') may not be intact as shown in <1002> of FIG. 10. Thus, the electronic device 101 may change the display position of the rotated handwriting input positioned at the page border to preserve the shape of the handwriting input.

According to various embodiments, the electronic device 101 (e.g., the processor 120 of FIG. 1) may change the display position of the rotated specific block based on the disposition state of the rotated specific block. According to an embodiment, the electronic device 101 may identify the page where the handwriting inputs included in the rotated specific block are most disposed and change the display position of all the handwriting inputs included in the rotated specific block to allow the rotated specific block to be displayed in the page. For example, referring to <1002> and <1003> of FIG. 10, the electronic device 101 may identify that the rotated handwriting inputs are disposed more in a first page 1041 and a second page 1042 of the memo application by analyzing the strokes of the handwriting input (e.g., 'efgh') included in the rotated second block 1032 and change the display position of all the handwriting inputs included in the rotated second block 1032 to the first page 1041.

Figure 11:
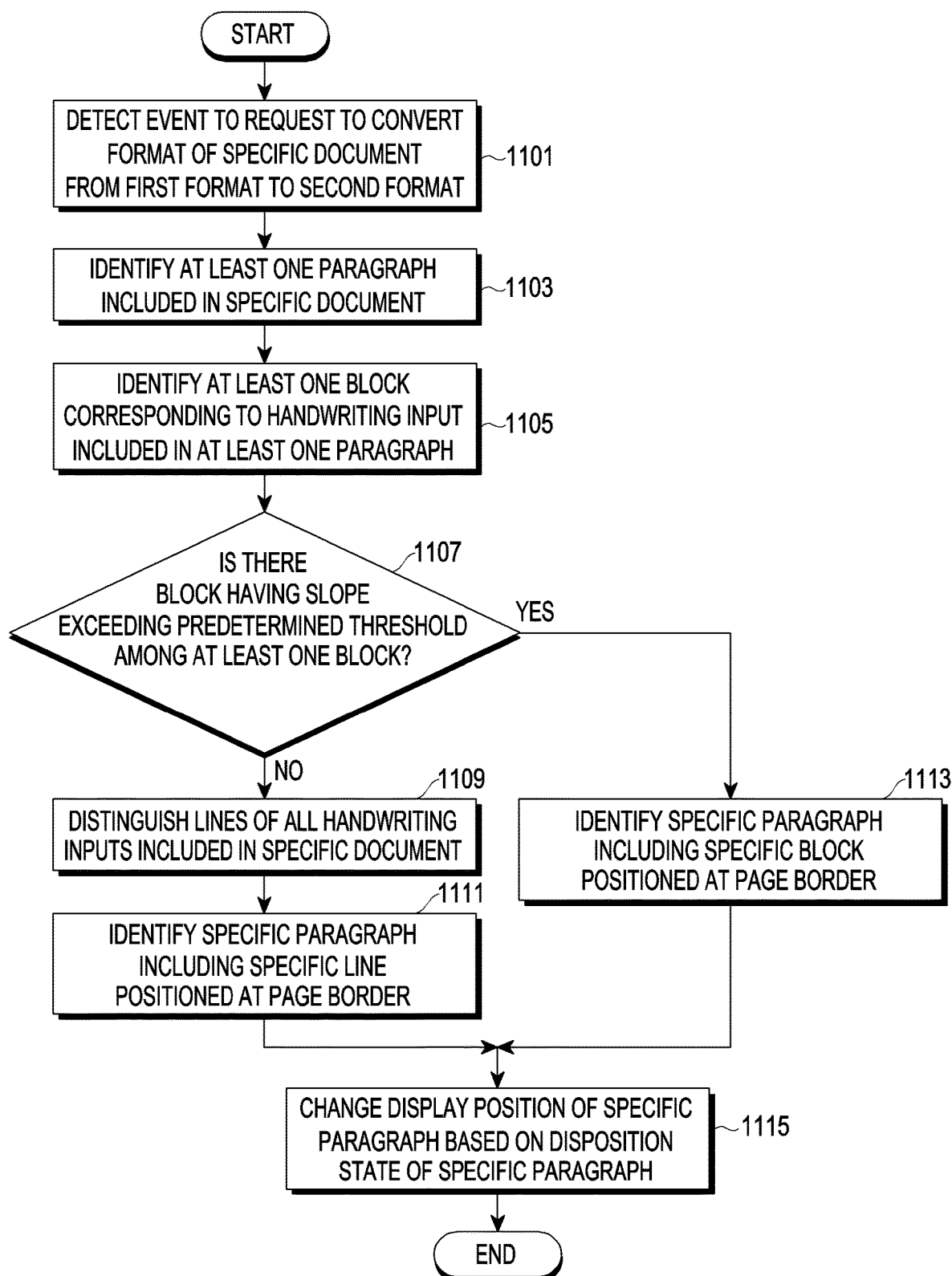
FIG. 11 is a flowchart illustrating a method for changing the display position of a handwriting input positioned at a border of a page in a specific document as an electronic device converts the format of the specific document according to an embodiment of the disclosure.
Figure 12:
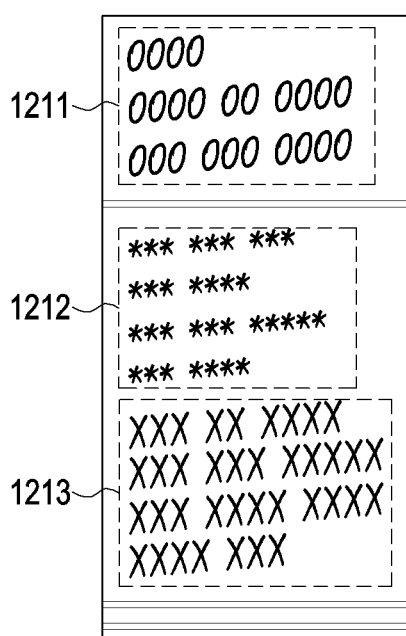
FIG. 12 illustrates an embodiment of distinguishing paragraphs by an electronic device according to an embodiment of the disclosure.
Figure 12:
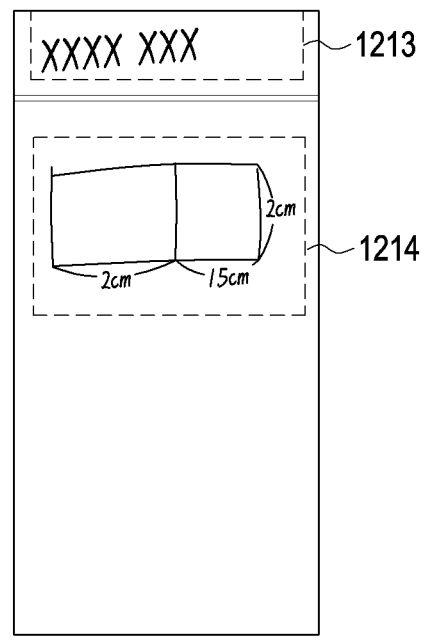
Figure 13:
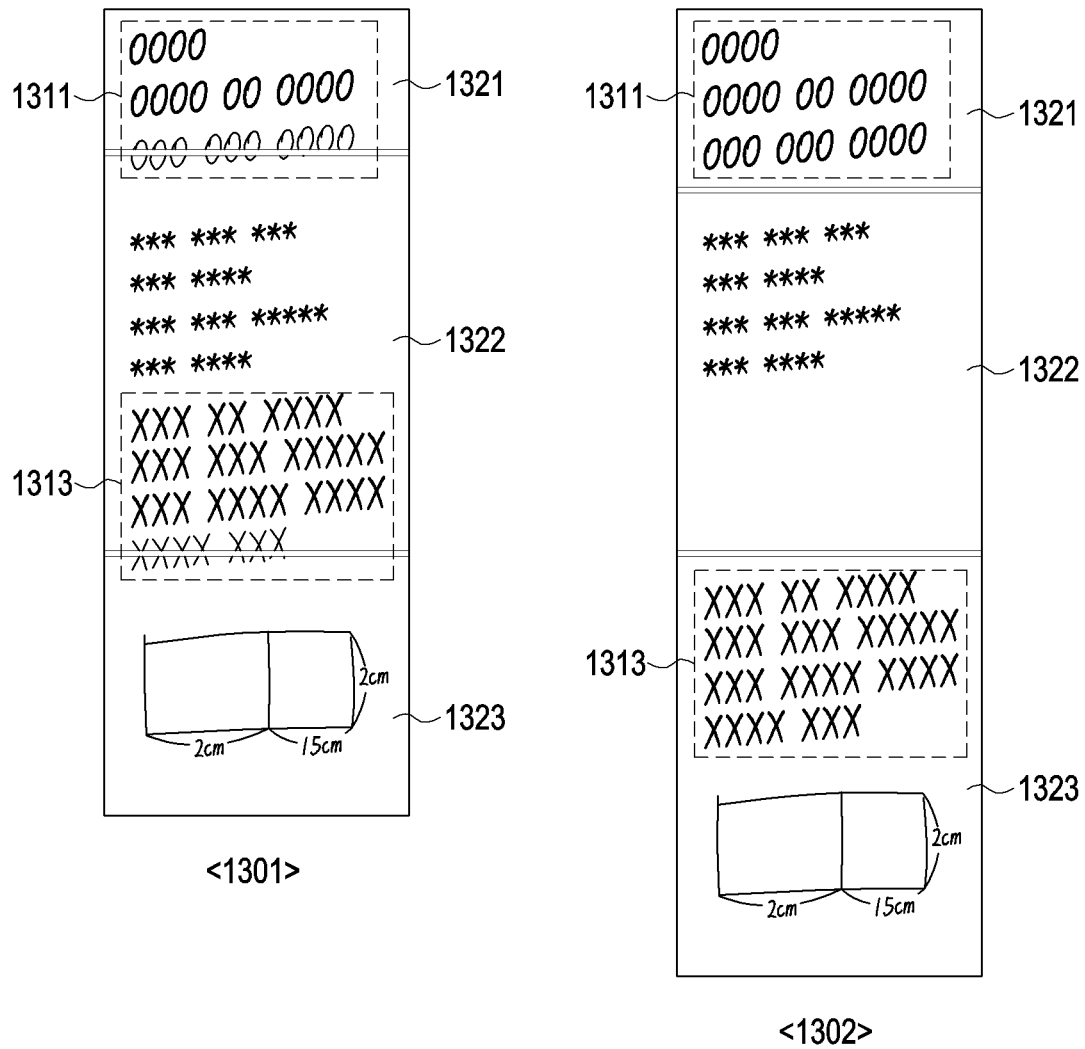
FIG. 13 illustrates an embodiment of changing the display position of a paragraph based on the disposition state of the paragraph by an electronic device according to an embodiment of the disclosure.

FIG. 11 is a flowchart illustrating a method for changing the display position of a handwriting input positioned at a border of a page in a specific document as an electronic device (e.g., the electronic device 101 of FIG. 1) converts the format of the specific document according to an embodiment of the disclosure. FIG. 12 illustrates an embodiment of distinguishing paragraphs by an electronic device 101 according to an embodiment of the disclosure. FIG. 13 illustrates an embodiment of changing the display position of a paragraph based on the disposition state of the paragraph by an electronic device 101 according to an embodiment of the disclosure.

Referring to FIG. 11, in operation 1101, according to various embodiments, the electronic device 101 (e.g., the processor 120 of FIG. 1) may detect an event to request to convert the format of a specific document from a first format to a second format. The first format may represent a format with no page border, and the second format may represent a format with a page border.

In operation 1103, according to various embodiments, the electronic device 101 (e.g., the processor 120 of FIG. 1) may identify at least one paragraph included in a specific document. According to an embodiment, the electronic device 101 may distinguish at least one paragraph including lines or blocks based on the distance between the lines or the blocks exceeding a predetermined distance. For example, referring to <1201> of FIG. 12, the electronic device 101 may distinguish a first paragraph 1211 including a first line and a second paragraph 1212 including a second line based on the distance between the first line and the second line exceeding a predetermined distance. According to an embodiment, the electronic device 101 may identify that continuous handwriting inputs with the same characteristics (e.g., font color, font size, or font shape) are in the same paragraph by analyzing the strokes of the handwriting inputs. For example, referring to <1201> of FIG. 12, the electronic device 101 may distinguish a second paragraph 1212 written in a first font color from a third paragraph 1213 written in a second font color different from the first font color. According to an embodiment, the electronic device 101 may distinguish at least one paragraph based on at least one of the distance or size of a first area corresponding to letters and a second area corresponding to nonletters. For example, referring to <1202> of FIG. 12, the electronic device 101 may distinguish the entire area 1214 including the first area and the second area as one paragraph, based on the first area corresponding to letters (e.g., 2 cm, 1.5 cm, and 2 cm) being positioned within a predetermined distance from the second area corresponding to nonletters (e.g., rectangle), and the size of the second area being equal to or larger than a predetermined multiple of the size of the first area. According to an embodiment, the electronic device 101 may distinguish at least one paragraph based on the handwriting input whose indentation exceeds a predetermined distance. The above-described operations for distinguishing at least one paragraph may be learned based on machine learning.

In operation 1105, according to various embodiments, the electronic device 101 (e.g., the processor 120 of FIG. 1) may identify at least one block corresponding to the handwriting input included in at least one paragraph. The electronic device 101 may perform the operation of identifying the block corresponding to each handwriting input using the method described in connection with operation 605 of FIG. 6.

In operation 1107, according to various embodiments, the electronic device 101 (e.g., the processor 120 of FIG. 1) may determine whether there is a block having a slope exceeding a predetermined threshold among at least one block. The electronic device 101 may perform the operation of determining whether there is a block having a slope exceeding a predetermined threshold using the method described in connection with operation 607 of FIG. 6.

In operation 1109, according to various embodiments, the electronic device 101 (e.g., the processor 120 of FIG. 1) may distinguish the lines of all the handwriting inputs included in the specific document. The electronic device 101 may perform the operation of distinguishing the lines of all the handwriting inputs included in the specific document using the method described in connection with operation 609 of FIG. 6.

In operation 1111, according to various embodiments, the electronic device 101 (e.g., the processor 120 of FIG. 1) may identify a specific paragraph including a specific line positioned at the page border. The electronic device 101 may perform the operation of identifying the specific paragraph including the specific line positioned at the page border using the method described in connection with operation 611 of FIG. 6.

In operation 1113, according to various embodiments, the electronic device 101 (e.g., the processor 120 of FIG. 1) may identify a specific paragraph including a specific block positioned at the page border. The electronic device 101 may perform the operation of identifying the specific paragraph including the specific block positioned at the page border using the method described in connection with operation 615 of FIG. 6.

In operation 1115, according to various embodiments, the electronic device 101 (e.g., the processor 120 of FIG. 1) may change the display position of the specific paragraph based on the disposition state of the specific paragraph. According to an embodiment, the electronic device 101 may identify the page where the handwriting inputs included in the specific paragraph are most disposed and change the display position of all the handwriting inputs included in the specific paragraph to allow the specific paragraph to be displayed in the page. For example, referring to <1301> and <1302> of FIG. 13, the electronic device 101 may identify that a first paragraph 1311 is disposed more on a first page 1321 and a second page 1322 of the application by analyzing the strokes of the handwriting inputs included in the first paragraph 1311 positioned at the page border and change the display position of all the handwriting inputs included in the first paragraph 1311 to the first page 1321. According to an embodiment, when the size of the empty area in the target page where the specific paragraph is most disposed is smaller than the size of the specific area corresponding to the specific paragraph, the electronic device 101 may change the display position of all the handwriting inputs included in the specific paragraph to the page next to the target page. For example, referring to <1301> and <1302> of FIG. 13, the electronic device 101 may identify that a third paragraph 1313 is disposed more on the second page 1322 of the second page 1322 and a third page 1323 of the memo application by analyzing the strokes of the handwriting inputs included in the third paragraph 1313 positioned at the page border and select the second page 1322 as the target page. In this case, the electronic device 101 may change the display position of all the handwriting inputs included in the third paragraph 1313 to the third page 1323 which is next to the second page 1322, based on the size of the empty area being smaller than the area corresponding to the third paragraph 1313.

Figure 14:
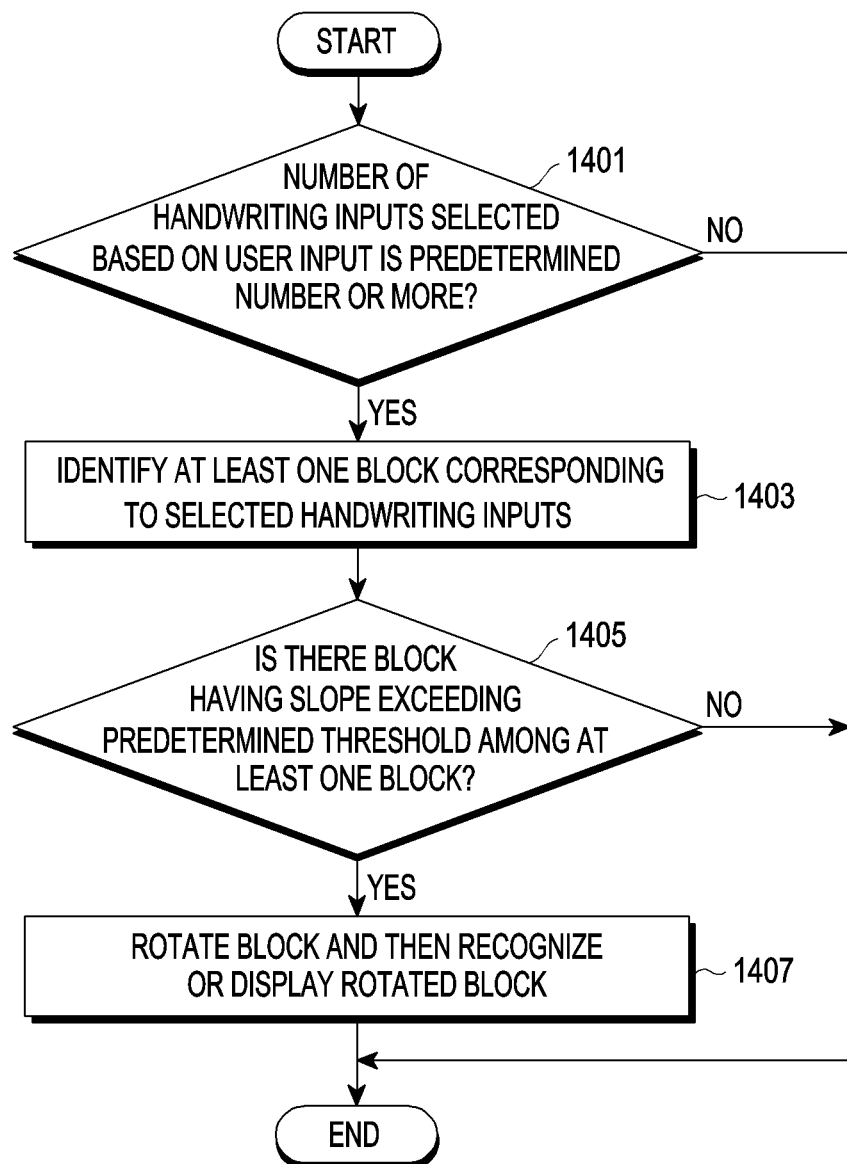
FIG. 14 is a flowchart illustrating a method for rotating a block and processing the rotated block by an electronic device according to an embodiment of the disclosure.
Figure 15:
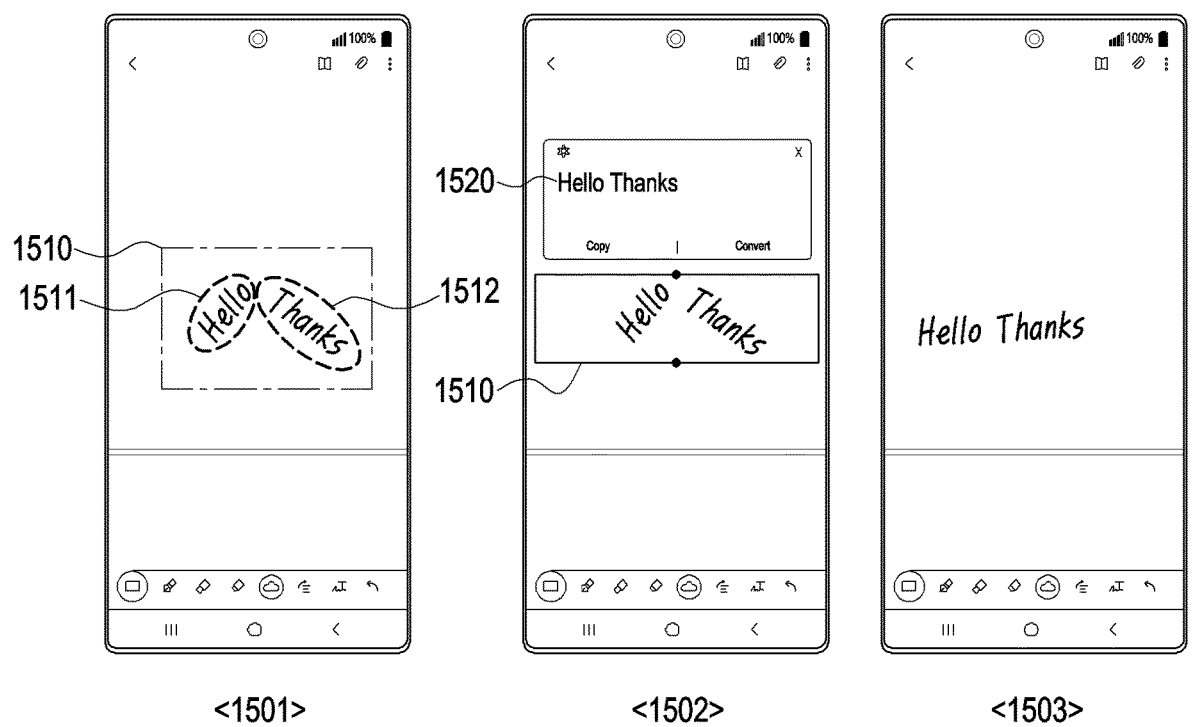
FIG. 15 illustrates an embodiment of recognizing or displaying a rotated block by an electronic device according to an embodiment of the disclosure.

FIG. 14 is a flowchart illustrating a method for rotating a block and processing the rotated block by an electronic device (e.g., the electronic device 101 of FIG. 1) according to an embodiment of the disclosure. FIG. 15 illustrates an embodiment of recognizing or displaying a rotated block by an electronic device 101 according to an embodiment of the disclosure.

Referring to FIG. 14, in operation 1401, according to various embodiments, the electronic device 101 (e.g., the processor 120 of FIG. 1) may identify whether the number of handwriting inputs selected based on a user input is a predetermined number or more. The electronic device 101 may perform operation 1401 using the method described in connection with operation 401 of FIG. 4. For example, referring to <1501> of FIG. 15, upon receiving an input for selecting a handwriting input (e.g., 'hello' and 'thanks') from the user, the electronic device 101 may display a graphic element 1510 indicating the area corresponding to the selected handwriting input and determine whether the number of the selected handwriting inputs is a predetermined number or more.

In operation 1403, according to various embodiments, the electronic device 101 (e.g., the processor 120 of FIG. 1) may identify at least one block corresponding to the selected handwriting inputs. The electronic device 101 may perform operation 1403 using the method described in connection with operation 403 of FIG. 4. For example, referring to <1501> of FIG. 15, the electronic device 101 may determine that 'hello' corresponds to a first block 1511, and 'thanks' corresponds to a second block 1512.

In operation 1405, according to various embodiments, the electronic device 101 (e.g., the processor 120 of FIG. 1) may determine whether there is a block having a slope exceeding a predetermined threshold among at least one block. For example, referring to FIG. 15, the electronic device 101 may identify that the slope (e.g., 40 degrees) of the first block 1511 exceeds a predetermined first threshold (e.g., 20 degrees), and the slope (e.g., −30 degrees) of the second block 1512 exceeds a predetermined second threshold (e.g., −15 degrees).

In operation 1407, according to various embodiments, the electronic device 101 (e.g., the processor 120 of FIG. 1) may rotate the block having a slope exceeding the predetermined threshold and recognize the rotated block or display it on the display (e.g., the display module 160 of FIG. 1). According to an embodiment, the electronic device 101 may recognize the handwriting input included in the rotated block according to reception of a text recognition request from the user. For example, referring to <1502> of FIG. 15, the electronic device 101 may recognize the handwriting input (e.g., 'hello') included in the rotated first block 1511 and the handwriting input (e.g., 'thanks') included in the rotated second block 1512, convert the handwriting inputs into text data, and display converted text data 1520 on the display 160. According to an embodiment, the electronic device 101 may display the handwriting input included in the rotated block on the display 160 according to reception of a request to display the rotated block from the user. For example, referring to <1503> of FIG. 15, the electronic device 101 may display the handwriting input (e.g., 'hello') included in the rotated first block 1511 and the handwriting input (e.g., 'thanks') included in the rotated second block 1512 on the display 160. According to an embodiment, the electronic device 101 may rotate the block having a slope exceeding the predetermined threshold and then perform an operation for processing at least one handwriting input using a line-based second separation scheme, based on the handwriting input included in the rotated block.

Figure 16:
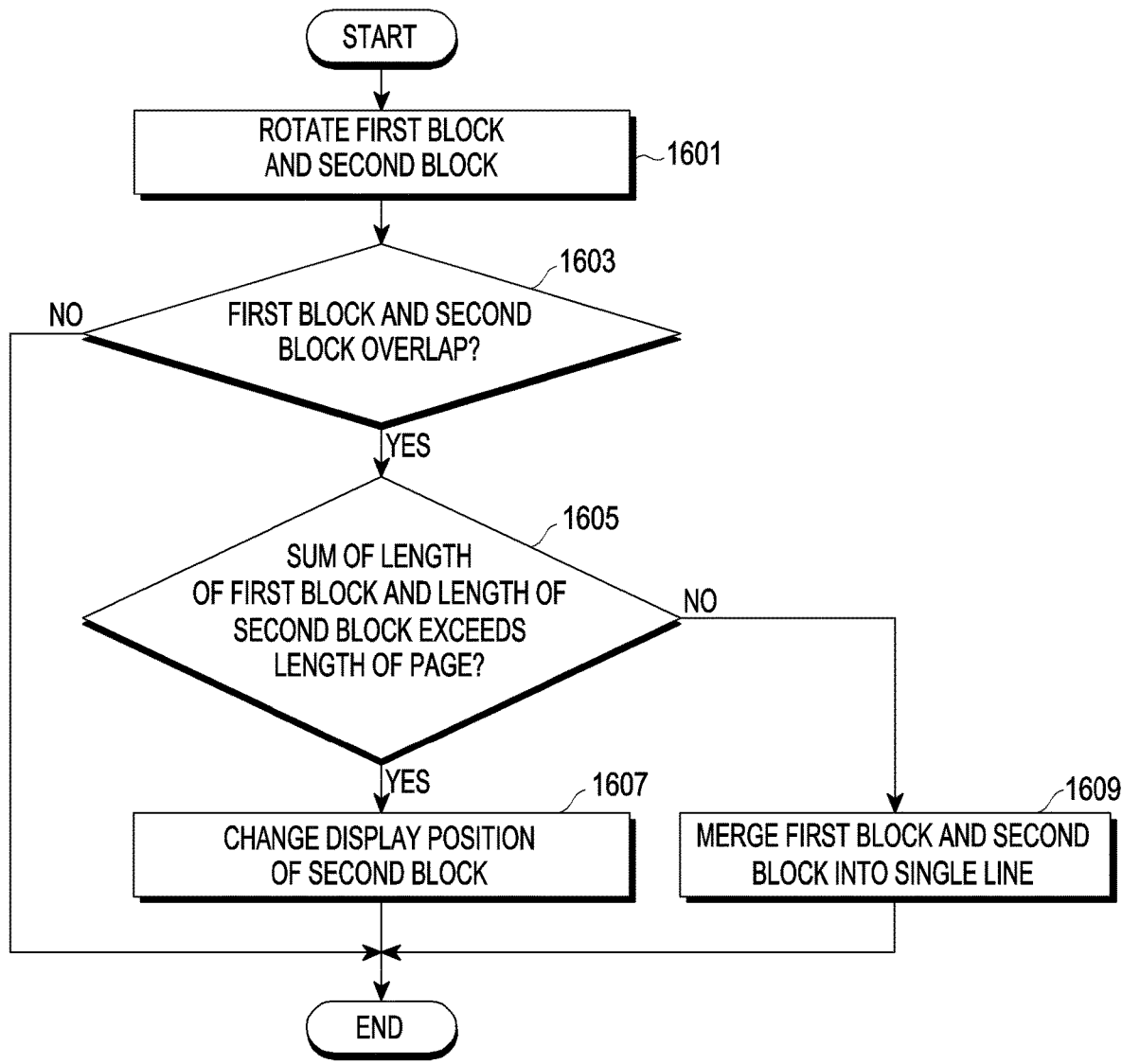
FIG. 16 is a flowchart illustrating a method for processing overlapping blocks when rotated blocks overlap by an electronic device according to an embodiment of the disclosure.
Figure 17:
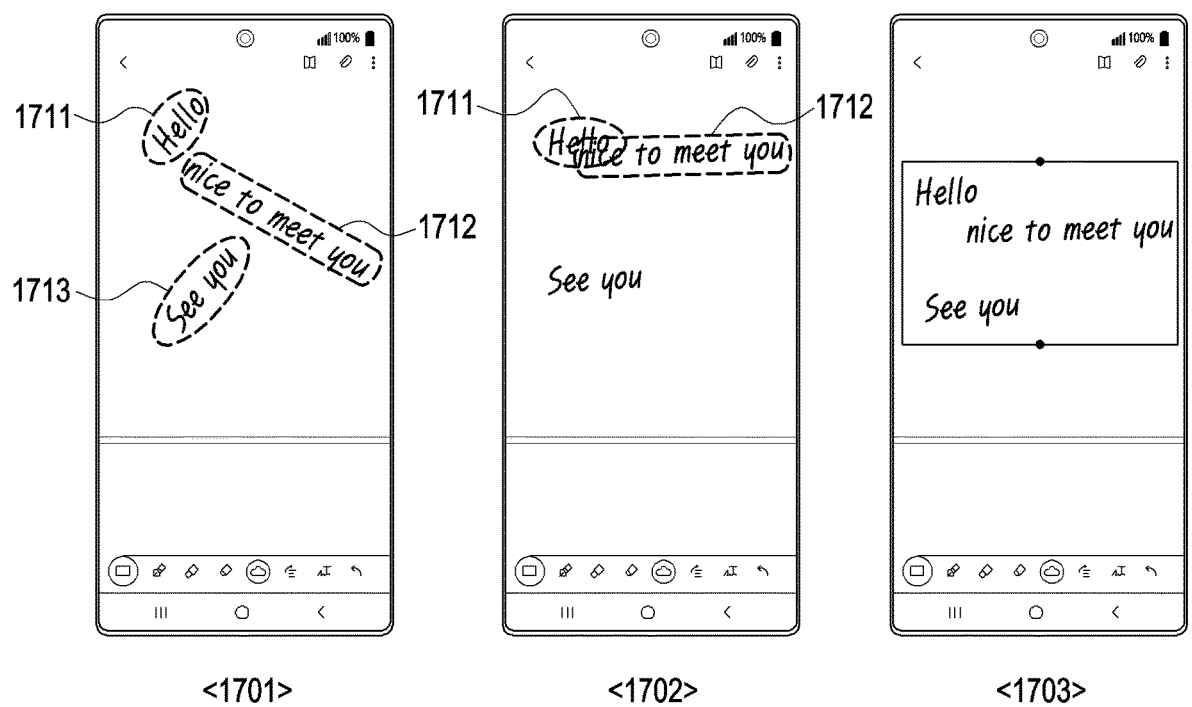
FIG. 17 illustrates an embodiment of changing the display position of an overlapping block by an electronic device according to an embodiment of the disclosure.

FIG. 16 is a flowchart illustrating a method for processing overlapping blocks when rotated blocks overlap by an electronic device (e.g., the electronic device 101 of FIG. 1) according to an embodiment of the disclosure. FIG. 17 illustrates an embodiment of changing the display position of an overlapping block by an electronic device 101 according to an embodiment of the disclosure.

Referring to FIG. 16, in operation 1601, according to various embodiments, the electronic device 101 (e.g., the processor 120 of FIG. 1) may rotate a first block and a second block. The electronic device 101 may rotate the first block and the second block using the method described in connection with FIG. 14. For example, referring to <1701> of FIG. 17, the electronic device 101 may receive a first user input for selecting a first block 1711 (e.g., 'hello') and a second block 1712 (e.g., 'nice to meet you') from the user and, upon receiving a request to display the rotated block or a request to recognize text for the selected first block 1711 and second block 1712, rotate the first block 1711 and the second block 1712.

In operation 1603, according to various embodiments, the electronic device 101 (e.g., the processor 120 of FIG. 1) may identify whether the rotated first block and second block overlap. If the overlapping blocks are displayed as they are, the handwriting inputs included in the first block 1711 and the second block 1712 may not remain intact as in <1702> of FIG. 17. Thus, the electronic device 101 may change the display position of the overlapping block to preserve the shape of the handwriting input.

In operation 1605, according to various embodiments, the electronic device 101 (e.g., the processor 120 of FIG. 1) may identify whether the sum of the length of the first block and the length of the second block exceeds the length of the horizontal width of the page, based on at least a portion of the rotated second block overlapping on the first block.

In operation 1607, according to various embodiments, the electronic device 101 (e.g., the processor 120 of FIG. 1) may change the display position of the second block, based on the sum of the length of the first block and the length of the second block exceeding the length of the horizontal width of the page. For example, referring to <1703> of FIG. 17, the electronic device 101 may change the display position of the second block 1712 to a position spaced apart from the display position of the first block 1711 by a predetermined distance, based on the sum of the length of the first block 1711 and the length of the second block 1712 exceeding the length of the page. According to an embodiment, the electronic device 101 may change the display position of the second block further based on the rotation direction of the second block. For example, referring to <1703> of FIG. 17, the electronic device 101 may change the display position of the second block to a position spaced apart from the display position of the first block 1711 by a predetermined distance in the y-axis direction, based on the sum of the length of the first block 1711 and the length of the second block 1712 exceeding the length of the page, and the second block 1712 being rotated in the x-axis direction.

In operation 1609, according to various embodiments, the electronic device 101 (e.g., the processor 120 of FIG. 1) may merge the first block and the second block into a single block based on the sum of the length of the first block and the length of the second block being equal to or shorter than the length of the page. According to an embodiment, the electronic device 101 may merge the plurality of blocks into one block further based on the order of creation of the blocks and the display position. For example, referring to <1701> and <1703> of FIG. 17, although the sum of the length of the second block 1712 and the length of the third block 1713 is equal to or shorter than the length of the page, the second block 1712 and the third block 1713 may be processed as different blocks, rather than being merged into a single block, based on the display position of the second block 1712 created earlier being positioned to the right of the display position of the third block 1713 created later.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 of FIG. 1) may comprise a display (e.g., the display 160 of FIG. 1) and a processor (e.g., the processor 120 of FIG. 1). The processor may be configured to identify a first slope (e.g., the first slope 312 of FIG. 3A) between a first handwriting input (e.g., the first handwriting input 310 of FIG. 3A) displayed on the display and a first preceding handwriting input (e.g., the first preceding handwriting input 311 of FIG. 3A) preceding the first handwriting input, the first handwriting input corresponding to a first block, identify a second slope (e.g., the second slope 322 of FIG. 3A) between a second handwriting input (e.g., the second handwriting input 320 of FIG. 3A) displayed on the display and a second preceding handwriting input (e.g., the second preceding handwriting input 321 of FIG. 3A) preceding the second handwriting input, the second handwriting input being a handwriting input continuous to the first handwriting input, determine whether the second handwriting input corresponds to the first block or corresponds to a second block different from the first block, using the first slope and the second slope, and perform at least one operation for processing a plurality of handwriting inputs indicating the second block, based on the second handwriting input corresponding to the second block.

According to various embodiments, the processor may be configured to determine that the second handwriting input corresponds to the second block different from the first block, based on a difference in slope between the first slope and the second slope exceeding a predetermined first value.

According to various embodiments, the processor may be configured to identify a first distance between the first handwriting input and the second handwriting input and determine that the second handwriting input corresponds to the second block different from the first block, based on the difference in slope being the predetermined first value or less, and the first distance exceeding a predetermined second value.

According to various embodiments, the processor may be configured to determine that the second handwriting input corresponds to the first block, based on the difference in slope being the predetermined first value or less, and the first distance being the predetermined second value or less.

According to various embodiments, the processor may be configured to determine whether the second handwriting input corresponds to the first block or corresponds to the second block, based on a user input to move the second handwriting input to a border (e.g., the border 720 of FIG. 7) of a page in a memo application.

According to various embodiments, the processor may be configured to determine whether the second handwriting input corresponds to the first block or corresponds to the second block, based on a user input to request to switch a format of a specific document including the second handwriting input from a first format to a second format.

According to various embodiments, the processor may be configured to identify whether there is a block having a slope exceeding a predetermined threshold among at least one block including the second block.

According to various embodiments, the processor may be configured to identify a specific block positioned at a border of a page in a memo application, based on there being the block having the slope exceeding the predetermined threshold and control the display to change a display position of the specific block based on a disposition state of the specific block.

According to various embodiments, the processor may be configured to rotate at least one block including the second block based on a user input to request to convert the at least one block into text data, convert the rotated at least one block into the text data, and control the display to display the text data.

According to various embodiments, the processor may be configured to rotate at least one block including the second block based on a user input to request to rotate and display the at least one block and control the display to display the rotated at least one block.

According to various embodiments, a method for operating an electronic device may comprise identifying a first slope between a first handwriting input displayed on a display of the electronic device and a first preceding handwriting input preceding the first handwriting input, the first handwriting input corresponding to a first block, identifying a second slope between a second handwriting input displayed on the display and a second preceding handwriting input preceding the second handwriting input, the second handwriting input being a handwriting input continuous to the first handwriting input, determining whether the second handwriting input corresponds to the first block or corresponds to a second block different from the first block, using the first slope and the second slope, and performing at least one operation for processing a plurality of handwriting inputs indicating the second block, based on the second handwriting input corresponding to the second block.

According to various embodiments, determining whether the second handwriting input corresponds to the first block or corresponds to the second block may include determining that the second handwriting input corresponds to the second block different from the first block, based on a difference in slope between the first slope and the second slope exceeding a predetermined first value.

According to various embodiments, determining whether the second handwriting input corresponds to the first block or corresponds to the second block may include identifying a first distance between the first handwriting input and the second handwriting input and determining that the second handwriting input corresponds to the second block different from the first block, based on the difference in slope being the predetermined first value or less, and the first distance exceeding a predetermined second value.

According to various embodiments, determining whether the second handwriting input corresponds to the first block or corresponds to the second block may include determining that the second handwriting input corresponds to the first block, based on the difference in slope being the predetermined first value or less, and the first distance being the predetermined second value or less.

According to various embodiments, determining whether the second handwriting input corresponds to the first block or corresponds to the second block may include determining whether the second handwriting input corresponds to the first block or corresponds to the second block, based on a user input to move the second handwriting input to a border of a page in a memo application.

According to various embodiments, determining whether the second handwriting input corresponds to the first block or corresponds to the second block may include determining whether the second handwriting input corresponds to the first block or corresponds to the second block based on a user input to request to convert a format of a specific document including the second handwriting input from a first format to a second format.

According to various embodiments, performing the at least one operation for processing the plurality of handwriting inputs indicating the second block may include identifying whether there is a block having a slope exceeding a predetermined threshold among at least one block including the second block.

According to various embodiments, performing the at least one operation for processing the plurality of handwriting inputs indicating the second block may include identifying a specific block positioned at a border of a page in a memo application, based on there being the block having the slope exceeding the predetermined threshold and controlling the display to change a display position of the specific block based on a disposition state of the specific block.

According to various embodiments, performing the at least one operation for processing the plurality of handwriting inputs indicating the second block may include rotating at least one block including the second block based on a user input to request to convert the at least one block into text data, converting the rotated at least one block into the text data, and controlling the display to display the text data.

According to various embodiments, performing the at least one operation for processing the plurality of handwriting inputs indicating the second block may include rotating at least one block including the second block based on a user input to request to rotate and display the at least one block and controlling the display to display the rotated at least one block.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   at least one processor; and
   memory storing instructions that, when executed by the at least one processor individually or collectively, cause the electronic device to:
   identify a first slope between a first handwriting input displayed on the display and a preset number of first strokes preceding the first handwriting input, wherein the first handwriting input corresponds to a first block,
   identify a second slope between a second handwriting input displayed on the display and the preset number of second strokes including the first handwriting input preceding the second handwriting input, wherein the second handwriting input is a handwriting input continuous to the first handwriting input,
   based on a difference in slope between the first slope and the second slope, determine whether the second handwriting input corresponds to the first block or corresponds to a second block different from the first block, and
   perform at least one operation for processing a plurality of handwriting inputs indicating the second block, based on the second handwriting input corresponding to the second block.

2. The electronic device of claim 1, wherein the instructions, when executed by the at least one processor individually or collectively, further cause the electronic device to:
   determine that the second handwriting input corresponds to the second block different from the first block, based on the difference in slope between the first slope and the second slope exceeding a predetermined first value.

3. The electronic device of claim 2, wherein the instructions, when executed by the at least one processor individually or collectively, further cause the electronic device to:
   identify a first distance between the first handwriting input and the second handwriting input; and
   determine that the second handwriting input corresponds to the second block different from the first block, based on the difference in slope being the predetermined first value or less, and the first distance exceeding a predetermined second value.

4. The electronic device of claim 3, wherein the instructions, when executed by the at least one processor individually or collectively, further cause the electronic device to:
   determine that the second handwriting input corresponds to the first block, based on the difference in slope being the predetermined first value or less, and the first distance being the predetermined second value or less.

5. The electronic device of claim 1, wherein the instructions, when executed by the at least one processor individually or collectively, further cause the electronic device to:
   determine whether the second handwriting input corresponds to the first block or corresponds to the second block, based on a user input to move the second handwriting input to a border of a page in a memo application.

6. The electronic device of claim 1, wherein the instructions, when executed by the at least one processor individually or collectively, further cause the electronic device to:
   determine whether the second handwriting input corresponds to the first block or corresponds to the second block, based on a user input to request to switch a format of a specific document including the second handwriting input from a first format to a second format.

7. The electronic device of claim 1, wherein the instructions, when executed by the at least one processor individually or collectively, further cause the electronic device to:
   identify whether there is a block having a slope exceeding a predetermined threshold among at least one block including the second block.

8. The electronic device of claim 7, wherein the instructions, when executed by the at least one processor individually or collectively, further cause the electronic device to:
   identify a specific block positioned at a border of a page in a memo application, based on there being the block having the slope exceeding the predetermined threshold; and
   control the display to change a display position of the specific block based on a disposition state of the specific block.

9. The electronic device of claim 1, wherein the instructions, when executed by the at least one processor individually or collectively, further cause the electronic device to:
   rotate at least one block including the second block based on a user input to request to convert the at least one block into text data;
   convert the rotated at least one block into the text data; and
   control the display to display the text data.

10. The electronic device of claim 1, wherein the instructions, when executed by the at least one processor individually or collectively, further cause the electronic device to:

rotate at least one block including the second block based on a user input to request to rotate and display the at least one block; and control the display to display the rotated at least one block.

11. A method for operating an electronic device, the method comprising:

identifying a first slope between a first handwriting input displayed on a display of the electronic device and a preset number of first strokes preceding the first handwriting input, wherein the first handwriting input corresponds to a first block;

identifying a second slope between a second handwriting input displayed on the display and the preset number of second strokes including the first handwriting input preceding the second handwriting input, wherein the second handwriting input is a handwriting input continuous to the first handwriting input;

based on a difference in slope between the first slope and the second slope, determining whether the second handwriting input corresponds to the first block or corresponds to a second block different from the first block; and performing at least one operation for processing a plurality of handwriting inputs indicating the second block, based on the second handwriting input corresponding to the second block.

12. The method of claim 11, wherein the determining of whether the second handwriting input corresponds to the first block or corresponds to the second block includes:

determining that the second handwriting input corresponds to the second block different from the first block, based on the difference in slope between the first slope and the second slope exceeding a predetermined first value.

13. The method of claim 12, wherein the determining of whether the second handwriting input corresponds to the first block or corresponds to the second block includes:

identifying a first distance between the first handwriting input and the second handwriting input; and determining that the second handwriting input corresponds to the second block different from the first block, based on the difference in slope being the predetermined first value or less, and the first distance exceeding a predetermined second value.

14. The method of claim 13, wherein the determining of whether the second handwriting input corresponds to the first block or corresponds to the second block includes:

determining that the second handwriting input corresponds to the first block, based on the difference in slope being the predetermined first value or less, and the first distance being the predetermined second value or less.

15. The method of claim 11, wherein the determining of whether the second handwriting input corresponds to the first block or corresponds to the second block includes:

determining whether the second handwriting input corresponds to the first block or corresponds to the second block, based on a user input to move the second handwriting input to a border of a page in a memo application.

16. The method of claim 11, wherein the determining of whether the second handwriting input corresponds to the first block or corresponds to the second block includes:

determining whether the second handwriting input corresponds to the first block or corresponds to the second block, based on a user input to request to switch a format of a specific document including the second handwriting input from a first format to a second format.

17. The method of claim 11, wherein the performing of the at least one operation for processing the plurality of handwriting inputs indicating the second block includes:

identifying whether there is a block having a slope exceeding a predetermined threshold among at least one block including the second block.

18. The method of claim 11, wherein the performing of the at least one operation for processing the plurality of handwriting inputs indicating the second block includes:

rotating at least one block including the second block based on a user input to request to convert the at least one block into text data;

converting the rotated at least one block into the text data; and controlling the display to display the text data.

19. The method of claim 11, wherein the performing of the at least one operation for processing the plurality of handwriting inputs indicating the second block includes:

rotating at least one block including the second block based on a user input to request to rotate and display the at least one block; and controlling the display to display the rotated at least one block.

20. One or more non-transitory computer-readable storage media storing computer-executable instructions that, when executed by at least one processor of an electronic device individually or collectively, cause the electronic device to perform operations, the operations comprising:

identifying a first slope between a first handwriting input displayed on a display of the electronic device and a preset number of first strokes preceding the first handwriting input, wherein the first handwriting input corresponds to a first block;

identifying a second slope between a second handwriting input displayed on the display and the preset number of second strokes including the first handwriting input preceding the second handwriting input, wherein the second handwriting input is a handwriting input continuous to the first handwriting input;

based on a difference in slope between the first slope and the second slope, determining whether the second handwriting input corresponds to the first block or corresponds to a second block different from the first block; and performing at least one operation for processing a plurality of handwriting inputs indicating the second block, based on the second handwriting input corresponding to the second block.

* * * * *